US009296374B2

(12) United States Patent
Yamakado et al.

(10) Patent No.: US 9,296,374 B2
(45) Date of Patent: Mar. 29, 2016

(54) MOTION CONTROLLING APPARATUS FOR A VEHICLE

(71) Applicant: Hitachi Automotive Systems, Ltd., Hitachinaka-shi, Ibaraki (JP)

(72) Inventors: Makoto Yamakado, Tokyo (JP); Mitsuhide Sasaki, Hitachinaka (JP); Mikio Ueyama, Hitachinaka (JP); Keiichiro Nagatsuka, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/432,270

(22) PCT Filed: Sep. 20, 2013

(86) PCT No.: PCT/JP2013/075402
§ 371 (c)(1),
(2) Date: Mar. 30, 2015

(87) PCT Pub. No.: WO2014/054432
PCT Pub. Date: Apr. 10, 2014

(65) Prior Publication Data
US 2015/0239442 A1 Aug. 27, 2015

(30) Foreign Application Priority Data

Oct. 1, 2012 (JP) ................................ 2012-219017

(51) Int. Cl.
*G06F 19/00* (2011.01)
*B60T 8/1755* (2006.01)
(Continued)

(52) U.S. Cl.
CPC .............. *B60T 8/1755* (2013.01); *B60L 3/102* (2013.01); *B60L 3/108* (2013.01); *B60L 7/26* (2013.01);
(Continued)

(58) Field of Classification Search
CPC ............ B60W 2720/14; B60W 10/08; B60W 10/184; B60W 30/045; B60T 8/1755
USPC ................. 701/40, 69, 70, 89, 301; 180/244; 303/146, 186, 190
See application file for complete search history.

(56) References Cited

U.S. PATENT DOCUMENTS

| 7,328,955 B2* | 2/2008 | Tsukasaki | ............... B60T 13/74 180/244 |
| 8,989,981 B2* | 3/2015 | Yamakado | ............ B60T 8/1755 701/69 |

(Continued)

FOREIGN PATENT DOCUMENTS

| JP | 5-16789 A | 1/1993 |
| JP | 2002-340925 A | 11/2002 |

(Continued)

OTHER PUBLICATIONS

Peng et al. Traction/Braking Force Distribution for Optimal Longitudinal Motion During Curve Following, 1996, Internet p. 1-25.*

(Continued)

*Primary Examiner* — McDieunel Marc
(74) *Attorney, Agent, or Firm* — Crowell & Moring LLP

(57) ABSTRACT

Provided is a motion controlling apparatus for a vehicle that can achieve improvement in drivability, stability, and driving comfort. The apparatus includes a control unit for controlling driving forces of vehicle wheels; a vehicle acceleration/deceleration instruction calculator for calculating an acceleration/deceleration instruction value on the basis of a lateral jerk; a first vehicle yaw moment instruction calculator for calculating a first vehicle yaw moment instruction value on the basis of the lateral jerk; and a second vehicle yaw moment instruction calculator for calculating a second vehicle yaw moment instruction value on the basis of lateral slip information.

20 Claims, 26 Drawing Sheets

(51) Int. Cl.
  *B60L 3/10*    (2006.01)
  *B60L 7/26*    (2006.01)
  *B60L 15/20*   (2006.01)
  *B60W 10/08*   (2006.01)
  *B60W 10/184*  (2012.01)
  *B60W 30/045*  (2012.01)
  *B60W 20/00*   (2006.01)
  *B60W 40/114*  (2012.01)

(52) U.S. Cl.
  CPC ............ *B60L 15/20* (2013.01); *B60L 15/2009* (2013.01); *B60W 10/08* (2013.01); *B60W 10/184* (2013.01); *B60W 20/00* (2013.01); *B60W 30/045* (2013.01); *B60W 40/114* (2013.01); *B60L 2220/42* (2013.01); *B60L 2220/44* (2013.01); *B60L 2240/12* (2013.01); *B60L 2240/22* (2013.01); *B60L 2240/423* (2013.01); *B60L 2250/26* (2013.01); *B60L 2260/28* (2013.01); *B60T 2270/303* (2013.01); *B60W 2520/10* (2013.01); *B60W 2520/105* (2013.01); *B60W 2520/20* (2013.01); *B60W 2540/18* (2013.01); *B60W 2710/083* (2013.01); *B60W 2720/106* (2013.01); *B60W 2720/14* (2013.01); *Y02T 10/648* (2013.01); *Y02T 10/7275* (2013.01)

(56) References Cited

U.S. PATENT DOCUMENTS

| | | | | |
|---|---|---|---|---|
| 2009/0234526 A1* | 9/2009 | Taki | ............... | B60T 7/22 701/23 |
| 2010/0010723 A1* | 1/2010 | Taki | ............... | F02N 11/0837 701/102 |
| 2010/0185375 A1* | 7/2010 | Hanzawa | ............... | B60T 8/174 701/70 |
| 2010/0332096 A1* | 12/2010 | Hanzawa | ............... | B60K 31/047 701/70 |
| 2012/0179349 A1 | 7/2012 | Yamakado et al. | | |
| 2013/0027222 A1* | 1/2013 | Kosai | ............... | G08G 1/163 340/902 |
| 2013/0116909 A1* | 5/2013 | Shida | ............... | B60W 30/16 701/96 |
| 2013/0144502 A1* | 6/2013 | Shida | ............... | B60K 31/0008 701/96 |
| 2014/0222244 A1* | 8/2014 | Ogawa | ............... | G01P 1/103 701/1 |
| 2015/0063648 A1* | 3/2015 | Minemura | ............... | G06K 9/6217 382/104 |
| 2015/0066269 A1* | 3/2015 | Niimi | ............... | B60L 1/003 701/22 |
| 2015/0084807 A1* | 3/2015 | Nozawa | ............... | G01S 7/354 342/112 |

FOREIGN PATENT DOCUMENTS

| | | |
|---|---|---|
| JP | 2010-162911 A | 7/2010 |
| JP | 2011-73534 A | 4/2011 |
| JP | 2011-105096 A | 6/2011 |

OTHER PUBLICATIONS

Kang et al., Driving Control Algorithm for Maneuverability, Lateral Stability, and Rollover Prevention of 4WD Electric Vehicles With Independently Driven Front and Rear Wheels, 2011, IEEE, p. 2987-3001.*

Sill et al., Managing Axle Saturation for Vehicle Stability Control with Independent Wheel Drives, 2011, IEEE, p. 3960-3965.*

International Search Report (PCT/ISA/210) dated Nov. 5, 2013 with English-language translation (Two (2) pages).

Written Opinion (PCT/ISA/237) dated Nov. 5, 2013 (Three (3) pages).

* cited by examiner $G_{xt}$ IS DETERMINED BY GVC FROM LATERAL JERK $M_{zt}$ IS DETERMINED BY DYC FROM SKIDDING INFORMATION

FIG. 5

| NO | POSITION OF CONTROLLING ARITHMETIC OPERATION UNIT | CHARACTERISTIC, PROBLEM | LIMITING CONDITION |
|---|---|---|---|
| 1 | G-VECT CONTROL → CONVENTIONAL CONTROL<br>PREMIUM ESC | [CHARACTERISTIC]<br>· CONTROL IN WHICH HYDRAULIC PRESSURE RESPONSE IS SMOOTH AND QUIET<br>· TRANSIT TO SEAMLESS YAW CONTROL<br>· ALL ARE CLOSED BY ONE MAKER | · PREMIUM ESC HAVING SMOOTH HYDRAULIC PRESSURE RESPONSE AND HIGH DURABILITY |
| 2 | G-VECT CONTROL → CONVENTIONAL CONTROL  CONVENTIONAL CONTROL<br>ELECTRO-HYDRAULIC BRAKE ACTUATOR  GENERAL-PURPOSE ESC | [CHARACTERISTIC]<br>· CONTROL IN WHICH HYDRAULIC PRESSURE RESPONSE IS SMOOTH AND QUIET<br>· REGENERATIVE COOPERATION IS POSSIBLE<br>[PROBLEM]<br>· MOUNTABILITY<br>· TRANSIT TO YAW CONTROL ON LOW μ ROAD | · YAW CONTROL IS ON ESC |
| 3 | CONVENTIONAL CONTROL  G-VECT CONTROL  ADDITIONAL SOFTWARE  CONVENTIONAL CONTROL<br>STEREO, SINGLE-EYE CAMERA (ADAS FUNCTION BUILT IN)  PREMIUM ESC | [CHARACTERISTIC]<br>· EXPANDABILITY TO APPLICATION USING CAMERA<br>[PROBLEM]<br>· TRANSIT TO YAW CONTROL ON LOW μ ROAD | · PREMIUM ESC HAVING SMOOTH HYDRAULIC PRESSURE RESPONSE AND HIGH DURABILITY<br>· ADDITION OF INTERFACE SOFTWARE TO ESC |
| 4 | CONVENTIONAL CONTROL  G-VECT CONTROL  ADDITIONAL SOFTWARE  CONVENTIONAL CONTROL<br>ADAS ECU  PREMIUM ESC | [CHARACTERISTIC]<br>· EXPANDABILITY TO VARIOUS ADAS FUNCTIONS<br>[PROBLEM]<br>· TRANSIT TO YAW CONTROL ON LOW μ ROAD | · PREMIUM ESC HAVING SMOOTH HYDRAULIC PRESSURE RESPONSE AND HIGH DURABILITY<br>· ADDITION OF INTERFACE SOFTWARE TO ESC |
| 5 | CONVENTIONAL CONTROL  G-VECT CONTROL  ADDITIONAL SOFTWARE  CONVENTIONAL CONTROL<br>HCM,VCM  INVERTER<br>CONVENTIONAL CONTROL<br>GENERAL-PURPOSE ESC | [CHARACTERISTIC]<br>· ENERGY REGENERATION IS POSSIBLE UPON NORMAL TRAVELING (UPON NON-OPERATION OF BRAKE)<br>[PROBLEM]<br>· TRANSIT TO YAW CONTROL ON LOW μ ROAD | · TARGETED AT MOTOR VEHICLE |
| 6 | G-VECT CONTROL  ADDITIONAL SOFTWARE  CONVENTIONAL CONTROL<br>GVC ECU  PREMIUM ESC | [CHARACTERISTIC]<br>· DEVELOPMENT IN SHORT PERIOD<br>· STANDARD ATTACHMENT TO ALL CARS IS POSSIBLE<br>[PROBLEM]<br>· TRANSIT TO YAW CONTROL ON LOW μ ROAD | · PREMIUM ESC HAVING SMOOTH HYDRAULIC PRESSURE RESPONSE AND HIGH DURABILITY<br>· ADDITION OF INTERFACE SOFTWARE TO ESC |

FIG. 6

| | CONTROLLER FOR EXCLUSIVE USE | LATERAL SLIP INFORMATION THRESHOLD VALUE | SMART ACTUATOR |
|---|---|---|---|
| ESC | ○ | ○ | △ |
| MOMENT+ | | TRANSIT CONTROL | ○ |
| GVC | | | ○ |
| HYBRID+ | ALLOWABLE ALSO FOR GENERAL-PURPOSE ESC | SEAMLESS | ALLOWABLE ALSO FOR DIFFERENT ACTUATOR |

FIG. 17

(A1) ADDITION OF POSITIVE MOMENT BY LEFT-RIGHT DIFFERENTIAL BRAKING-DRIVING INPUT

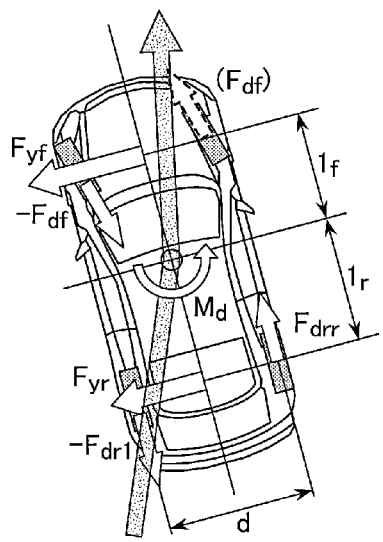

(B1) POSITIVE MOMENT INCREASING EFFECT UTILIZING LOAD MOVEMENT FROM REAR WHEELS TO FRONT WHEELS BY BRAKING

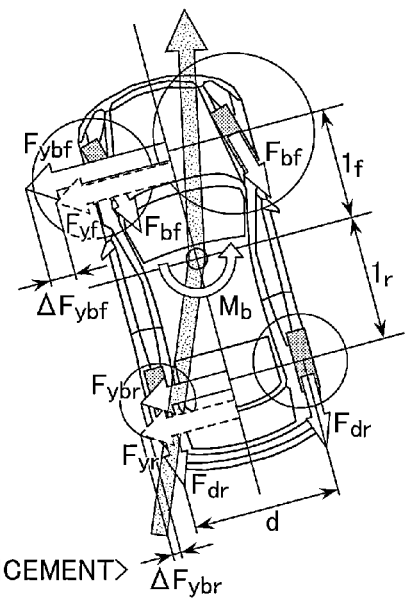

<DRIVABILITY ENHANCEMENT>

(A2) ADDITION OF NEGATIVE MOMENT BY LEFT-RIGHT DIFFERENTIAL BRAKING-DRIVING INPUT

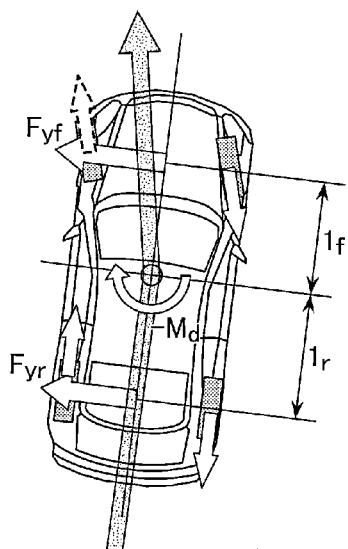

(B2) NEGATIVE MOMENT INCREASING EFFECT UTILIZING LOAD MOVEMENT FROM REAR WHEELS TO FRONT WHEELS BY DRIVING

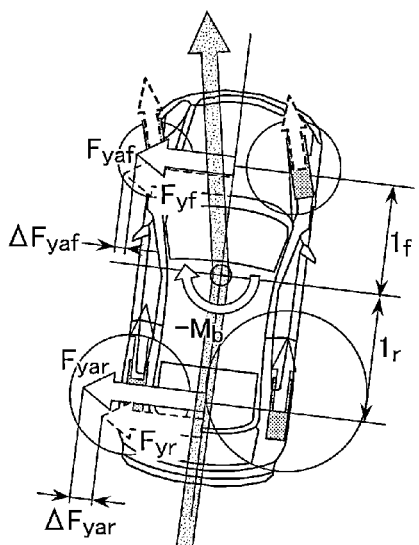

<STABILITY ENHANCEMENT>

FIG. 30A
L TURN (LOW μ ROAD)
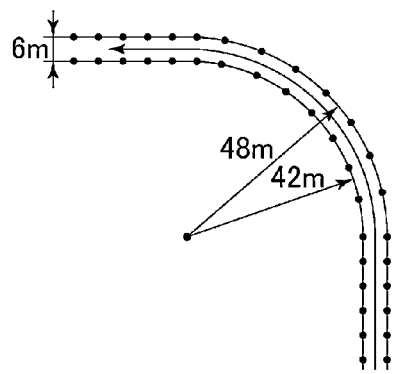
FIG. 30B
SINGLE LANE CHANGE
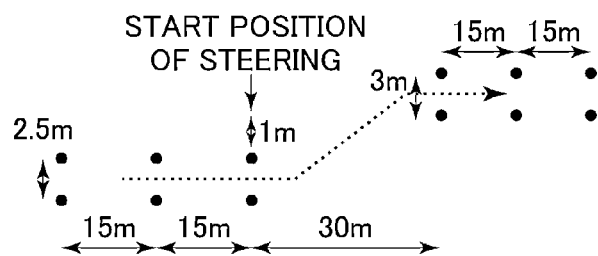
FIG. 30C
HANDLING COURSE
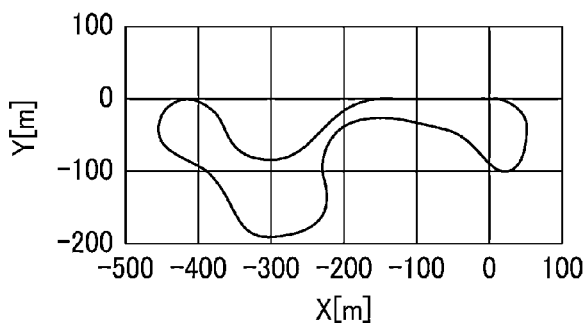
FIG. 31
<SUBSTANCE OF CONTROL>
| CASE | ESC | GVC | M+ | OUTLINE <NICKNAME> |
|------|-----|-----|-----|----------------------|
| a | ON | ON | ON | HYBRID+ CONTROL OF THE INVENTION |
| b | ON | OFF | OFF | NORMAL ESC VEHICLE EQUIVALENT |
| c | ON | OFF | ON | GVC OFF |
| d | ON | ON | OFF | DIFFERENT CONTROLLER HYBRID CONTROL |
| e | OFF | ON | ON | GVC&M+ |
| f | OFF | ON | OFF | ONLY GVC |
| g | OFF | OFF | ON | ONLY MOMENT |
| h | OFF | OFF | OFF | NO CONTROL |

FIG.39

| No | POSITION OF CONTROLLING ARITHMETIC OPERATION UNIT | CHARACTERISTIC, PROBLEM | CONSTRAINT CONDITION |
|---|---|---|---|
| 1 | GVC M+ → CONVENTIONAL CONTROL<br>PREMIUM ESC | [CHARACTERISTIC]<br>· CONTROL IN WHICH HYDRAULIC PRESSURE RESPONSE IS SMOOTH AND QUIET<br>· TRANSIT TO SEAMLESS YAW CONTROL<br>· ALL ARE CLOSED BY ONE MAKER | · PREMIUM ESC HAVING SMOOTH HYDRAULIC PRESSURE RESPONSE AND HIGH DURABILITY |
| 2 | GVC M+ → CONVENTIONAL CONTROL   CONVENTIONAL CONTROL<br>ELECTRO-HYDRAULIC BRAKE ACTUATOR   GENERAL-PURPOSE ESC | [CHARACTERISTIC]<br>· CONTROL IN WHICH HYDRAULIC PRESSURE RESPONSE IS SMOOTH AND QUIET<br>· REGENERATIVE COOPERATION IS POSSIBLE<br>[PROBLEM]<br>· MOUNTABILITY | · YAW CONTROL IS ON ESC |
| 3 | CONVENTIONAL CONTROL GVC M+ → ADDITIONAL SOFTWARE CONVENTIONAL CONTROL<br>STEREO, SINGLE-EYE CAMERA (ADAS FUNCTION BUILT IN)   PREMIUM ESC | [CHARACTERISTIC]<br>· EXPANDABILITY TO APPLICATION USING CAMERA | · PREMIUM ESC HAVING SMOOTH HYDRAULIC PRESSURE RESPONSE AND HIGH DURABILITY<br>· ADDITION OF INTERFACE SOFTWARE TO ESC |
| 4 | CONVENTIONAL CONTROL GVC M+ → ADDITIONAL SOFTWARE CONVENTIONAL CONTROL<br>ADAS ECU   PREMIUM ESC | [CHARACTERISTIC]<br>· EXPANDABILITY TO VARIOUS ADAS FUNCTIONS | · PREMIUM ESC HAVING SMOOTH HYDRAULIC PRESSURE RESPONSE AND HIGH DURABILITY<br>· ADDITION OF INTERFACE SOFTWARE TO ESC |
| 5 | CONVENTIONAL CONTROL GVC M+ → ADDITIONAL SOFTWARE CONVENTIONAL CONTROL<br>HCM,VCM   INVERTER<br>CONVENTIONAL CONTROL<br>GENERAL-PURPOSE ESC | [CHARACTERISTIC]<br>· ENERGY REGENERATION IS POSSIBLE UPON NORMAL TRAVELING<br>(UPON NON-OPERATION OF BRAKE) | · TARGETED AT MOTOR VEHICLE |
| 6 | GVC M+ → ADDITIONAL SOFTWARE CONVENTIONAL CONTROL<br>GVC ECU   PREMIUM ESC | [CHARACTERISTIC]<br>· DEVELOPMENT IN SHORT PERIOD<br>· STANDARD ATTACHMENT TO ALL CARS IS POSSIBLE | · PREMIUM ESC HAVING SMOOTH HYDRAULIC PRESSURE RESPONSE AND HIGH DURABILITY<br>· ADDITION OF INTERFACE SOFTWARE TO ESC |

MOTION CONTROLLING APPARATUS FOR A VEHICLE

TECHNICAL FIELD

The present invention relates to a motion controlling apparatus for a vehicle which uses a braking force and a driving force.

BACKGROUND ART

In the field of automobiles, in order to implement improvement in environmental friendliness, safety and amenity, development not only of a vehicle controlling system such as an antiskid brake system (Electronic Stability Control: hereinafter referred to as ESC) for preventing spinning, off the track and so forth during turning but also of a vehicle controlling system which uses an intelligent transportation system (Intelligent Transport System: hereinafter referred to as ITS) such as a vehicle distance control (Adaptive Cruise Control: hereinafter referred to as ACC), a lane departure prevention system or pre-crash safety is being accelerated.

The ESC is vehicle motion control based on the concept of Direct Yaw-moment Control (DYC) (refer to Non-Patent Document 1).

This DYC is a technique for controlling the yawing moment for directly promoting or restoring a yawing motion, which is rotation around a Z axis of a vehicle, by providing a difference in braking forces or driving forces between the left and right wheels in order to improve the drivability and stability of the vehicle as described in Non-Patent Document 1.

Also a method is available by which acceleration or deceleration is performed automatically in conjunction with a lateral motion caused by a steering operation to give rise to a load movement between the front wheels and the rear wheels thereby to achieve improvement in drivability and stability of the vehicle (refer to Non-Patent Document 2).

The acceleration/deceleration instruction value for performing acceleration/deceleration automatically (target longitudinal acceleration $G_{xc}$) is such as represented by the Formula 1 given below.

$$G_{xc} = -\text{sgn}(G_y \cdot \dot{G}_y)\frac{C_{xy}}{1+Ts}|\dot{G}_y| + G_{x\_DC} \quad \text{[Formula 1]}$$

$$\text{※} \quad \dot{G}y = G_{y\_dot}$$

This formula indicates a simple control strategy that basically a value obtained by multiplying the lateral jerk $G_{y\_dot}$ by a gain $C_{xy}$ to apply a primary delay is used as a forward/rearward or longitudinal acceleration/deceleration instruction.

It is to be noted that $G_y$: vehicle lateral acceleration, $G_{y\_dot}$: vehicle lateral jerk, $C_{xy}$: gain, T: primary delay time constant, s: Laplace operator, and $G_{x\_DC}$: offset.

By this, part of a cooperation control strategy of lateral and forward/backward or longitudinal motions of an expert driver can be simulated, and improvement in drivability and stability of the vehicle can be implemented.

Where such control as just described is performed, a composite acceleration (represented by G) of the longitudinal acceleration and the lateral acceleration is vectorized (Vectoring) such that it exhibits a curved transition as time passes on a diagram wherein the axis of abscissa is the longitudinal acceleration of the vehicle and the axis of ordinate is the lateral acceleration of the vehicle. Therefore, the control is called "G-Vectoring control".

In this G-Vectoring control, the deceleration of the vehicle is controlled in response to the lateral jerk. On the other hand, the ESC controls the yaw moment of the vehicle in response to a lateral slip of the vehicle. Roughly speaking, the G-Vectoring control controls the sum of braking forces by the tires among the four wheels, and the ESC performs control of the difference in braking forces between each two left and right wheels. From such a relationship as just described, in Patent Document 1, a motion controlling apparatus for a vehicle is disclosed which is characterized in that the motion controlling apparatus for a vehicle has a first mode in which substantially equal braking or driving forces are generated by the left and right wheels from among four wheels based on an acceleration/deceleration controlling instruction linked to a lateral motion and a second mode in which different braking or driving forces are generated by the left and right wheels from among the four wheels based on a yaw moment controlling instruction calculated from lateral slip information of the vehicle. When the yaw moment instruction value is low, the motion controlling apparatus for a vehicle operates in the first mode, and when the yaw moment instruction value is high, the motion controlling apparatus for a vehicle operates in the second mode.

PRIOR ART DOCUMENTS

Patent Document

Patent Document 1: JP-2011-73534-A

Non-Patent Document

Non-Patent Document 1: Shibahata, Y; Tomari, T; and Kita, T.; "SH-AWD: Direct Yaw Control (DYC), 15. Aachener Kolloquium Fahrzeug-und Motorentechnik, p. 1627, 1640, 1641, 2006

Non-Patent Document 2: M. Yamakado, M. Abe: Improvement in vehicle agility and stability by G-Vectoring control, Vehicle System Dynamics Vol. 48, Supplement, 2010, 231-254

SUMMARY OF THE INVENTION

Problem to be Solved by the Invention

The ESC is a method of adjusting the driving forces for the wheels separately between the left and right wheels to generate a yawing movement and performing feedback control so that an ideal motion calculated on a vehicle motion model and an actual motion may approach each other. Since the yaw moment required for the control varies every moment on the basis of the motion state of the vehicle, in order to implement the yaw moment, roughly speaking, the following two requirements are applicable.

(1) Insurance of the Calculation Accuracy of an Ideal Motion State by High Accuracy and High Speed Calculation of a Vehicle Motion Model, Measurement/Estimation of a Vehicle Motion State, Calculation of Accurate Lateral Slip Information Thereby, and Calculation-Control of an Accurate Slip Rate To this end, a controller for exclusive use in an ESC unit is required whose installation in various environments which are different in communication speed such as a Control Area Network (CAN) and wherein a control state quantity itself (slip rate, a hydraulic pressure instruction or the like) is not influenced by communication with a CAN signal.

(2) Optimization of a Control Intervention Threshold Value for Early Actuation Prevention Originally, since the ESC applies different braking forces to the left and right wheels of the vehicle, when the driver notices operation of the ESC, the driver has such a feeling that ordinary braking fails on one side. Further, in the conventional ESC, since a plunger pump having a small number of cylinders is used or the hydraulic pressure accumulated in an accumulator is controlled by an ON/OFF valve, relative large operating sound and vibration are generated. Therefore, it is necessary to tune the ESC so that the ESC is actuated only in a really necessary scene. To this end, it is necessary to use a rather high control intervention threshold value so that the control is performed after the vehicle enters an unstable state with certainty.

However, the G-Vectoring control (hereinafter referred to as GVC) is open loop control where basically an acceleration/deceleration which increases in proportion to a lateral jerk of the vehicle is used as a control instruction, and therefore the control calculation load is low. Braking on occasions when deceleration control is performed is four-wheel same pressure control which is same as service braking which is normally handled by the driver. It has been reported that, even if such control is performed, the driver does not have an sense of uncomfortableness, and furthermore, high driving comfort since rolling and pitching of the vehicle cooperatively operate. This cooperative operation is because part of a cooperation control strategy of lateral and longitudinal motions of an expert driver is simulated. Further, since it is only necessary to perform deceleration control of the speed similar to that of the driver, it is possible to implement the control by sending a control instruction to a brake controller using an ordinary CAN signal. However, since the GVC involves frequent actuations from within a normal region, an actuator (smart actuator) for deceleration is required which is high in Noise, Vibration, and Harshness (NVH) performance in which no operating sound and no vibration are generated and which is high in durability.

Requirements for each of the ESC and the GVC and requirements for Hybrid control of a combination of them are depicted in FIG. 4. As described hereinabove, although the hybrid control of the ESC and the GVC is highest in exercise performance, in order for the hybrid control to satisfy the requirements for the ESC side, it is necessary to incorporate hybrid control software for the ESC and the GVC in a controller for exclusive use in an ESC unit of premium specifications which is superior in NVH performance. Further, by varying, for example, the threshold value on the ESC side to perform "tuning", it is also possible to smoothen cooperation between the GVC and the ESC. In particular, it is further possible to adopt a method that, by reducing the intervention threshold value for oversteer correction of the ESC, an improvement effect of Agility implemented by the GVC is made most of in the maximum (force the improvement effect to that in the proximity of the neutral steer) thereby to cope with any chance of spinning by the ESC.

Realistically, it is impossible except an ESC supplier to incorporate hybrid control software for the ESC and the GVC into a controller for exclusive use in an ESC unit. To provide the technology to a greater number of drivers, it is necessary to cope with a greater number of implementation forms. FIG. 5 depicts a comparison table indicating into which controller of hardware a GVC logic is to be incorporated (detail of control other than the GVC is described as conventional control). For example, No. 2 of FIG. 5 indicates a configuration that the GVC is implemented using an electro-hydraulic type brake actuator as a smart actuator and the lateral slip prevention effect is implemented by ordinary general-purpose ESC. Further, No. 5 indicates a configuration that regenerative braking forces in an electric car is used for the GVC and the lateral slip prevention effect is implemented by ordinary general-purpose ESC. Further, Nos. 1, 3, 4 and 6 indicate a configuration that, although premium ESC which exhibits a high NVH performance is used, except No. 1, a GVC logic is incorporated on the outer side of an ESC controller for which high speed calculation is required and ESC of premium specifications is externally controlled by a CAN signal.

To implement the modes other than No. 1, transit to slip control or yaw control on a low µ road is a problem. Naturally, since slip control represented by an ABS (Anti-lock Braking System) or the like or yaw control by the ESC operates even by itself, it is possible to ensure minimum stability. However, to achieve control proximate to seamless control as can be implemented by Hybrid control, it is necessary to construct not only integrated control of the GVC and the ESC but also new integrated control in which yaw moment control for transit is additionally integrated.

It is an object of the present invention to provide a motion controlling apparatus for a vehicle which can achieve improvement in drivability, stability and driving comfort.

Means for Solving the Problem

To achieve the object described above, A motion controlling apparatus for a vehicle, comprising:

a control unit for controlling independently driving forces or a driving torques and/or braking forces or braking torques of wheels of a vehicle;

a vehicle acceleration/deceleration instruction calculator for calculating a vehicle acceleration/deceleration instruction value on the basis of a lateral jerk of the vehicle;

a first vehicle yaw moment instruction calculator for calculating a first vehicle yaw moment instruction value on the basis of the lateral jerk of the vehicle; and a second vehicle yaw moment instruction calculator for calculating a second vehicle yaw moment instruction value on the basis of lateral slip information of the vehicle, wherein the motion controlling apparatus further includes:

a first mode under which acceleration/deceleration of the vehicle is controlled on the basis of the vehicle acceleration/deceleration instruction value that generates driving forces or driving torques and/or braking forces or braking torques of four wheels of the vehicle, the driving forces or driving torques for left wheels and that for right wheels being substantially equal to each other;

a second mode under which yaw moment of the vehicle is controlled on the basis of the first vehicle yaw moment instruction value that generates driving forces or driving torques and/or braking forces or braking torques of four wheels of the vehicle, the driving forces or driving torques for left wheels and that for right wheels being different from each other; and a third mode under which yaw moment of the vehicle is controlled on the basis of the second vehicle yaw moment instruction value that generates driving forces or driving torques and/or braking forces or braking torques of four wheels of the vehicle, the driving forces or driving torques for left wheels and that for right wheels being different from each other.

BRIEF DESCRIPTION OF THE DRAWINGS

FIG. 5 is a comparison table indicating in which controller a GVC logic is to be incorporated.

FIG. 6 is a diagram illustrating a relationship of ESC, Moment+, GVC and hybrid+control.

FIG. 17 is a diagram depicting a mechanism for improving drivability and stability by braking and driving control.

FIGS. 30A-30C are diagrams depicting a form of a test course for the verification of an effect of the present invention.

FIG. 31 is a table indicating control combinations (2^3) for the verification of an effect of the present invention.

FIG. 39 is a table indicating an embodiment which can be achieved by the present invention.

MODES FOR CARRYING OUT THE INVENTION

Figure 1:
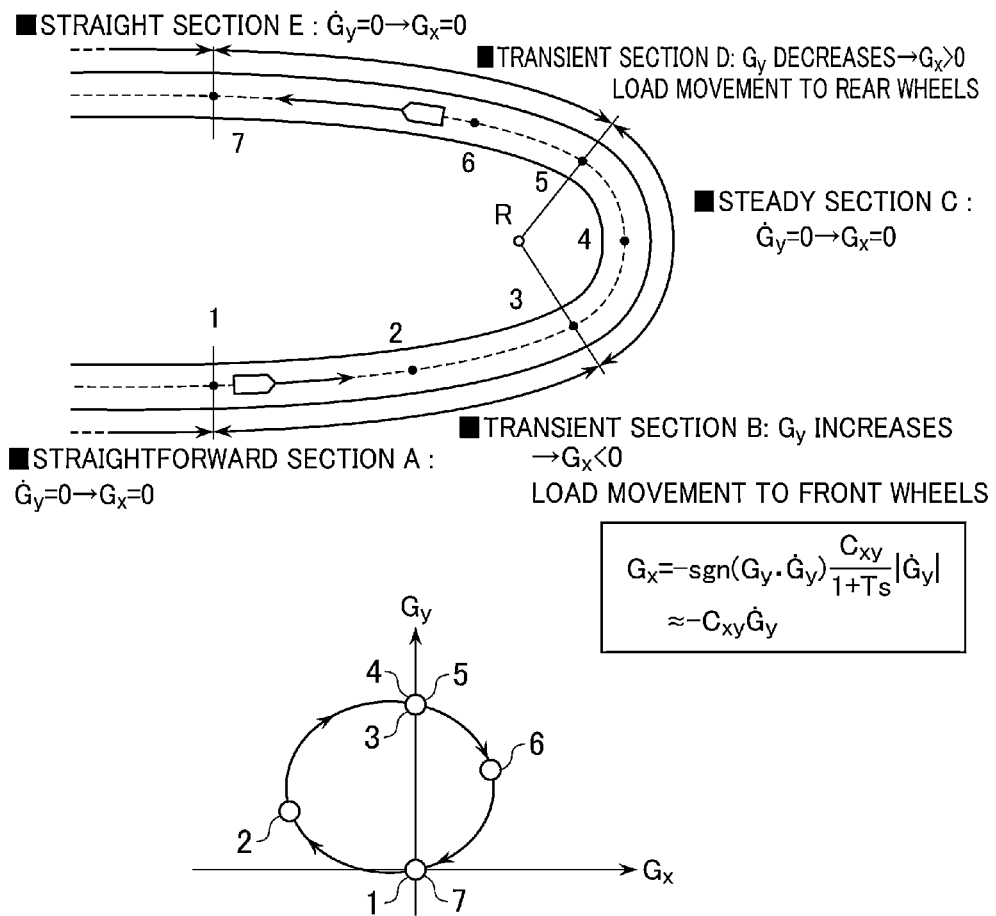
FIG. 1 is a diagram depicting a manner of a G-Vectoring control vehicle after it approaches a left corner until it leaves the left corner.

The motion controlling apparatus for a vehicle of the present invention has the following configuration as an overview.

The motion controlling apparatus for a vehicle of the present invention configures Hybrid+ control which is a combination of additional moment control (Moment plus; hereinafter referred to as M+) which operates from within a linear region for transit between GVC and ESC with GVC and ESC (DYC) (FIG. 6).

Further, the motion controlling apparatus for a vehicle of the present invention is configured such that a deceleration instruction of the GVC and a moment instruction of the M+ are calculated by the same controller and are sent for a controller for the ESC by communication and then the ESC controller integrates the deceleration and the moment so that control can be performed.

More particularly, the motion controlling apparatus for a vehicle according to the present invention has three modes of GVC, ESC and M+. In particular, a motion controlling apparatus for a vehicle which has means capable of controlling driving forces or driving torques and/or braking forces or braking torques of wheels of the vehicle independently of each other includes: vehicle acceleration/deceleration instruction calculation means for determining a vehicle acceleration/deceleration instruction value on the basis of a lateral jerk of the vehicle; first vehicle yaw moment instruction calculation means for determining a vehicle yaw moment instruction value based on the lateral jerk of the vehicle; and second vehicle yaw moment instruction calculation means for determining a vehicle yaw moment instruction value from lateral slip information of the vehicle. The motion controlling apparatus further includes: a first mode (GVC) for generating, on the basis of the vehicle acceleration/deceleration instruction value determined by the vehicle acceleration/deceleration instruction calculation means using the vehicle lateral jerk, substantially equal driving forces or driving torques and/or braking forces or braking torques on left and right wheels from among four wheels of the vehicle to control acceleration/deceleration of the vehicle; a second mode (M+)

for generating, on the basis of the vehicle yaw moment instruction value determined by the first vehicle yaw moment instruction calculation means using the vehicle lateral jerk, different driving forces or driving torques and/or braking forces or braking torques on the left and right wheels from among the four wheels of the vehicle to control a yaw moment of the vehicle; and a third mode (ESC) for generating, on the basis of the vehicle yaw moment instruction value determined by the second vehicle yaw moment instruction calculation means using the vehicle lateral slip information, different driving forces or driving torques and/or braking forces or braking torques on the left and right wheels from among the four wheels of the vehicle to control the yaw moment of the vehicle.

Further, the motion controlling apparatus for a vehicle is configured such that the first mode includes one or both of: a 1.1th mode (GVC−), applied when a product of the vehicle lateral acceleration and the vehicle lateral jerk is positive, under which deceleration of the vehicle is controlled on the basis of the vehicle acceleration/deceleration instruction value determined by the vehicle acceleration/deceleration instruction calculation means using the lateral jerk of the vehicle; and a 1.2th mode (GVC+), applied when the product of the vehicle lateral acceleration and the vehicle lateral jerk is negative, under which acceleration of the vehicle is controlled on the basis of the vehicle acceleration/deceleration instruction value determined by the vehicle acceleration/deceleration instruction calculation means using the lateral jerk of the vehicle.

Further, the motion controlling apparatus for a vehicle is configured such that the second mode includes one or both of: a 2.1th mode (M++), applied when the product of the vehicle lateral acceleration and the vehicle lateral jerk is in the positive, under which a yaw moment on the turning promotion side of the vehicle is controlled on the basis of a yaw moment instruction value at a vehicle turning promotion side serving as the first vehicle yaw moment instruction value, the first vehicle yaw moment instruction value being determined by the first vehicle yaw moment instruction calculation means using the lateral jerk of the vehicle; and a 2.2th mode (M+−), applied when the product of the vehicle lateral acceleration and the vehicle lateral jerk is in the negative, under which a yaw moment instruction value on the vehicle stabilization side of the vehicle is controlled on the basis of a yaw moment instruction value on the vehicle stabilization side which is the first vehicle yaw moment instruction value, the first vehicle yaw moment instruction value being determined by the first vehicle yaw moment instruction calculation means using the lateral jerk of the vehicle.

Further, the motion controlling apparatus for a vehicle is configured such that the third mode for controlling the yaw moment of the vehicle according to the lateral slip information includes both of: a 3.1th mode (ESC−) under which the yaw moment on the stabilization side of the vehicle is controlled on the basis of the yaw moment instruction value on the vehicle stabilization side determined by the second vehicle yaw moment instruction calculation means using the vehicle lateral slip information; and a 3.2th mode (ESC+) under which the yaw moment on the turning promotion side of the vehicle is controlled on the basis of the yaw moment instruction value on the vehicle turning promotion side.

Further, the motion controlling apparatus for a vehicle is configured such that it further includes arbitration means for arbitrating the first vehicle yaw moment instruction value determined by the first vehicle yaw moment instruction calculation means and the second vehicle yaw moment instruction value determined by the second vehicle yaw moment instruction calculation means, and that one of the first vehicle yaw moment instruction value and the second vehicle yaw moment instruction value which has a higher absolute value is adopted.

Furthermore, the motion controlling apparatus for a vehicle is configured such that at least the vehicle acceleration/deceleration instruction calculation means and the first vehicle yaw moment instruction calculation means are provided in the same controller. The vehicle acceleration/deceleration instruction value and the vehicle yaw moment instruction value are transmitted from the controller by communication to means for controlling driving forces or driving torques and/or braking forces or braking torques to the wheels of the vehicle independently of each other.

Here, a basic idea of the present invention is described in more detail.

Figure 2:
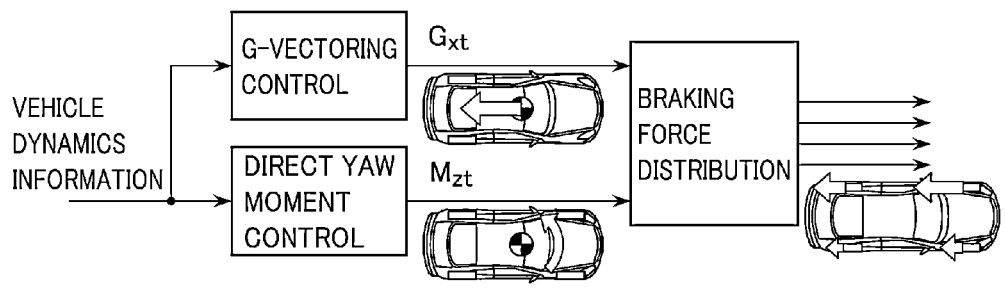
FIG. 2 is a diagram depicting a hybrid control configuration for DYC (ESC) and GVC.
Figure 3:
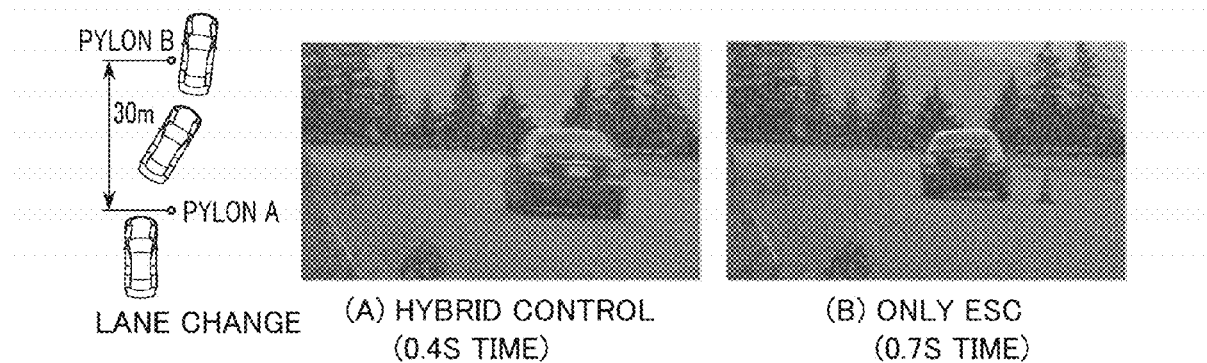
FIG. 3 is a diagram depicting operation situations only of ESC and of hybrid control at a time of lane change.
Figure 4:
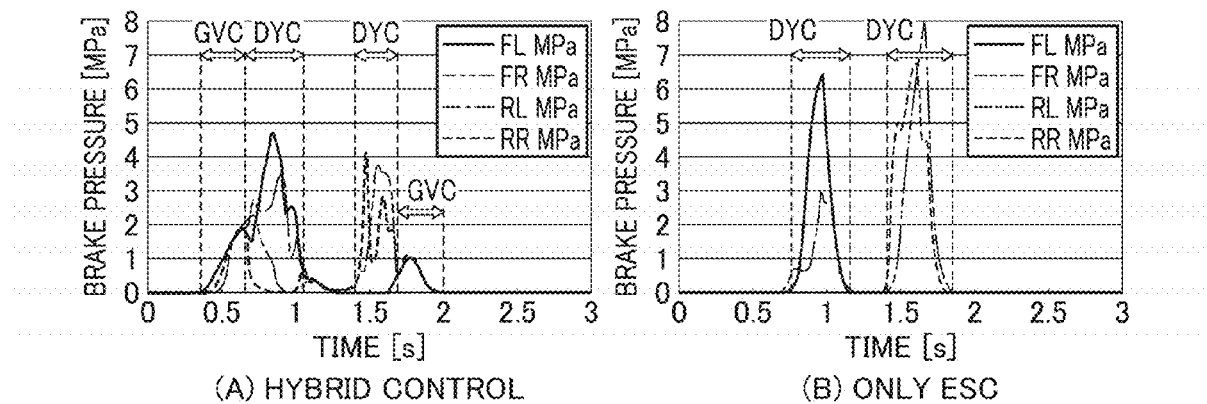
FIG. 4 is a table indicating requirements for ESC, GVC and hybrid control.
Figure 7:
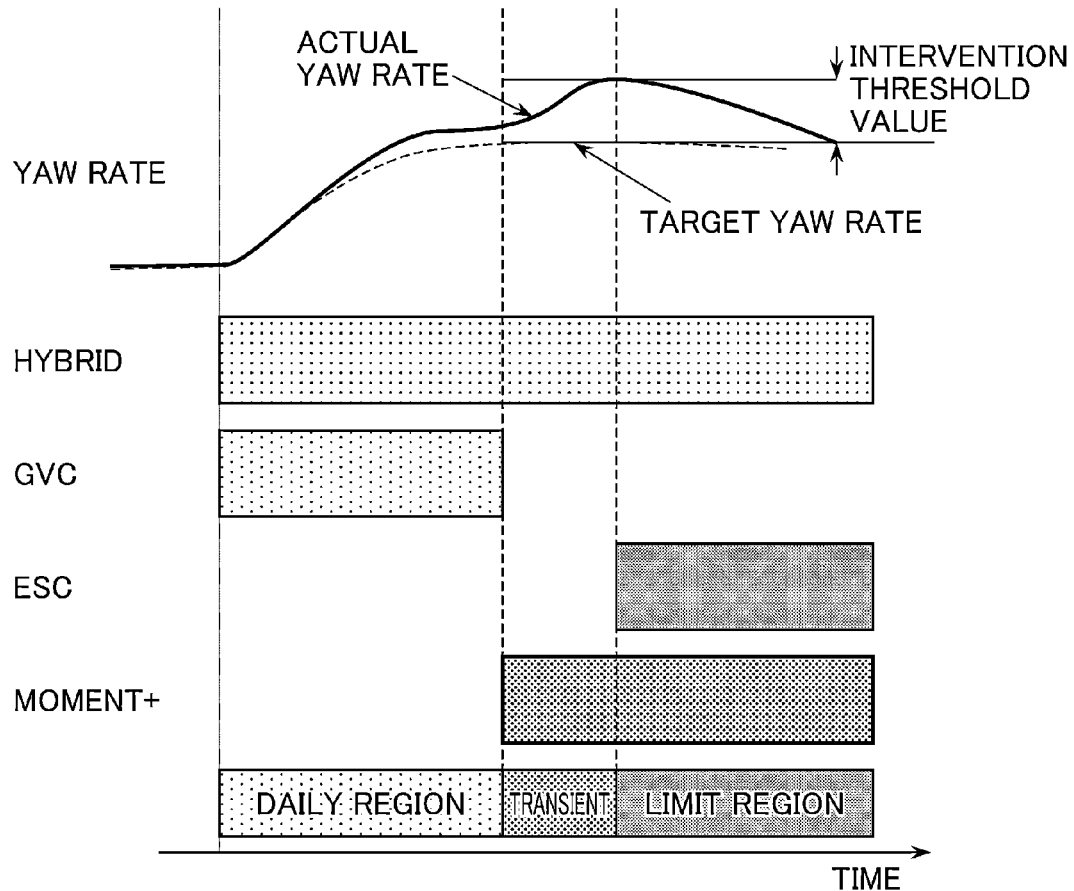
FIG. 7 is a diagram depicting an operation range and timing of Moment+ control.

To implement such seamless control as can be implemented by such Hybrid control as depicted in FIGS. 2 and 3 in various forms, it is necessary to construct new integrated control which not only includes integrated control of the GVC and the ESC but also additionally includes yaw moment control for transit. The moment control for transit is represented as Moment+ (moment plus) and is hereinafter referred to as M+. FIG. 7 is a schematic diagram depicting an operation range and timing of the M+.

At an upper stage of FIG. 7, a comparison between a target yaw rate, which is based on the steering angle and the vehicle speed, and an actual yaw rate. Here, a situation is assumed in which the ESC operates because the target yaw rate deviates from the actual yaw rate and exceeds an intervention threshold value. The GVC operates by applying equal braking forces to the left and right wheels for a period of time after starting of turning till entering steady turning, namely, within a normal region, and enhances both of the yaw rate gain and the lateral acceleration gain to improve the turning performance. Further, in the Hybrid control where both of the GVC and the ESC are incorporated in the same ESC controller, seamless control in all of the daily, transit and limit regions can be implemented. On the other hand, in the case of No. 4 in FIG. 5 wherein, for example, the ESC manufactured by a company A is adopted and the GVC is incorporated in an Advanced Driver Assist System (ADAS) controller manufactured by another company B, it is difficult to implement such seamless control as is implemented by the Hybrid control. The ESC does not operate unless the deviation between the target yaw rate and the actual yaw rate exceeds an intervention threshold value determined by the company A, and the motion control in the transit region between the daily region and the limit region becomes discontinuous.

Therefore, the M+ is configured such that moment control is started from within the transit region aiming at such effects as given below:

The yaw rate deviation is reduced from a point before the ESC becomes operative thereby to reduce the frequency of abrupt sudden intervention.

Even if the ESC starts operation, the ESC control input amplitude is reduced by intervention from within an early state.

In the limit region, a moment instruction value is generated together with the ESC as occasion demands.

New control wherein the M+ control having such control effects as described above and the GVC are combined is constructed, and the control calculation unit is incorporated in a controller other than the ESC. Thus, by sending a control instruction to the ESC, such a variety of modes as a mode in which a general-purpose ESC is used independently of the maker, another mode in which an electro-hydraulic type brake actuator is used for the normal region control (No. 2 of FIG. 5) and a further mode in which regenerative braking of an EV is used (No. 5 of FIG. 3) can be implemented.

Now, the moment control strategy in the transit state is examined. In the transit state, a control strategy which exhibits a vehicle stabilizing effect also in the transit state from the normal state to the limit state is required. Here, it is intended to derive a basic policy and a particular control strategy.

<Basic Policy of the Moment Control Strategy>

As a constraint condition for the control strategy of the M+, the following points of view are involved.

Wheel speed and lateral slip angle information which is being calculated at a high speed in the inside of the ESC controller is not used.

A simple control strategy which can be understood intuitively (the step number for tuning is small).

Cooperation with the GVC can be performed readily.

Figure 8:
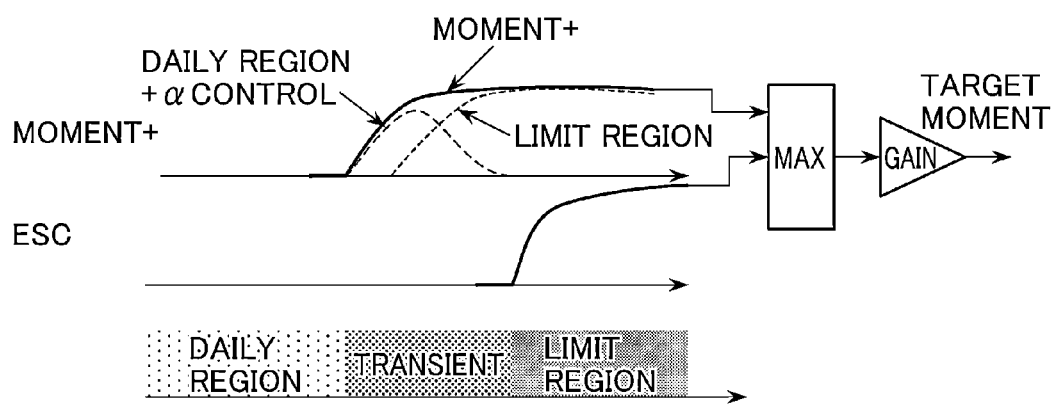
FIG. 8 is a diagram depicting a basic policy of a moment control strategy.

In addition, for control which operates in the transit state, if the moment control strategy has a configuration like a select high configuration of control for a daily region +α (region near by a small amount from the daily region to the limit) and the limit region, then it can be expected that a seamless control instruction can be obtained. Then, if the control entered the limit region, then transit to the ESC control (select high) is performed (FIG. 8).

When to derive a control strategy for the daily region +α, it was determined to refer to a driving behavior of a driver from the idea of "human-inspired (to mimic a driving behavior of a human being). Further, it was determined to derive a limit region control strategy on the basis of a vehicle behavior immediately before spinning occurs. In the description beginning with the next paragraph, control in the daily region and control in the limit region are successively examined.

<Derivation of a Control Strategy for the Moment+>

Daily Region+α Control

Although one accelerator pedal and one brake pedal are provided naturally, the driver cannot directly control the braking forces and the driving forces independently of each other to control the yaw moment. Accordingly, the control strategy for the yaw moment cannot be found out directly like the GVC (simulating a driving behavior of a human being). Therefore, a yaw moment generated by load movement based on a voluntary acceleration/deceleration behavior of the driver when the car is cornering is reconfirmed to achieve derivation of a control algorithm.

The GVC is acceleration/deceleration control associated with a lateral motion. Meanwhile, if acceleration or deceleration is performed, then the vertical load to the tires moves. For example, during deceleration, the vertical load moves from the rear wheels to the front wheels, but during acceleration, the vertical load moves from the front wheels to the rear wheels. On the other hand, as well known in the art, the cornering force is load-dependent. Here, where the cornering stiffness is represented by Ki (i=f, r, f: front, r: rear), when they have a first-order load dependency (proportional coefficient $C_1$) on the tire vertical load Wi, the cornering stiffness Ki can be represented by the Formula 2 given below.

$$K_i = C_1 W_i \qquad \text{[Formula 2]}$$

On the other hand, where the height of the center of gravity of the vehicle is represented by h, if the vehicle accelerates or decelerates by $G_x$, the front wheel load $W_f$ (to one front wheel) is represented by the Formula 3 given below.

$$W_f = \frac{m l_r g}{2l}\left(1 - \frac{h}{l_r g} G_x\right) \qquad \text{[Formula 3]}$$

The rear wheel load $W_r$ (to one rear wheel) is represented by the Formula 4 given below.

$$W_r = \frac{m l_r g}{2l}\left(1 + \frac{h}{l_f g} G_x\right) \qquad \text{[Formula 4]}$$

Accordingly, the cornering stiffness $K_f$ and $K_r$ are represented by the Formula 5 and the Formula 6 for the front and rear wheels, respectively.

$$K_f = C_1 W_f = C_1 \frac{m l_r g}{2l}\left(1 - \frac{h}{l_r g} G_x\right) = K_{f0}\left(1 - \frac{h}{l_r g} G_x\right) \qquad \text{[Formula 5]}$$

$$K_r = C_1 W_r = C_1 \frac{m l_f g}{2l}\left(1 + \frac{h}{l_f g} G_x\right) = K_{r0}\left(1 + \frac{h}{l_f g} G_x\right) \qquad \text{[Formula 6]}$$

Here, if it is assumed that the cornering forces increase in proportion to the lateral slip angle β, then the Formula 7 and the Formula 8 given below are satisfied.

$$Y_f = -K_f \alpha_f = -K_{f0}\left\{\left(1 - \frac{h}{l_r g} G_x\right)\alpha_f\right\} = Y_{f0}\left(1 - \frac{h}{l_r g} G_x\right) \qquad \text{[Formula 7]}$$

$$Y_r = -K_r \alpha_r = -K_{r0}\left\{\left(1 + \frac{h}{l_f g} G_x\right)\alpha_r\right\} = Y_{r0}\left(1 + \frac{h}{l_f g} G_x\right) \qquad \text{[Formula 8]}$$

If the relations given above are substituted into an equation of the lateral acceleration and the yaw motion, then the Formula 9 and the Formula 10 given below are obtained.

$$\begin{aligned}
mG_y &= 2(Y_{f0} + Y_{r0}) - \frac{2h}{g}\left(\frac{Y_{f0}}{l_r} - \frac{Y_{r0}}{l_f}\right)G_x \qquad \text{[Formula 9]}\\
&= 2(Y_{f0} + Y_{r0}) - \frac{h}{g l_f l_r} 2(l_f Y_{f0} - l_r Y_{r0}) G_x\\
&= mG_{y0} - \frac{h}{g l_f l_r} I_z \dot{r}_0 G_x = mG_{y0} - \frac{mh}{g} \dot{r}_0 G_x
\end{aligned}$$

$$\begin{aligned}
I_z \dot{r} &= 2\left(1_f Y_{f0}\left(1 - \frac{h}{1_r g} G_x\right) - 1_r Y_{r0}\left(1 + \frac{h}{1_f g} G_x\right)\right) \qquad \text{[Formula 10]}\\
&= 2(1_f Y_{f0} - 1_r Y_{r0}) - 2\frac{h}{g}\left(\frac{1_f}{1_r} Y_{f0} + \frac{1_r}{1_f} Y_{r0}\right) G_x\\
&\approx I_z \dot{r}_0 - \frac{mh}{g} G_{y0} G_x
\end{aligned}$$

※ $\dot{r}_0 = r_{0\_dot}$

Here, $G_{y0}$ and $r_{0\_dot}$ are the original lateral acceleration and the original yaw angular velocity when none of acceleration and deceleration is performed, respectively. If attention is paid to the finally transformed terms in the Formula 9 and the Formula 10 of the equation of motions, then it can be recognized that, if $G_x$ is in the negative, namely, if the vehicle decelerates, then the lateral acceleration and the yaw motion are strengthened.

In the Formula 10 of the equation of motion, the yaw moment $I_z$ of inertia can be approximately rewritten into the Formula 11 given below.

$$I_z = m \cdot 1_f l_r \qquad \text{[Formula 11]}$$

Accordingly, if the Formula 11 is substituted into the Formula 9 and the Formula 10 and resulting formulas are arranged in a matrix form and then the GVC control strategy is applied to the formulas, then the Formula 12 given below is obtained.

$$\begin{pmatrix} mG_y \\ I_z \dot{r} \end{pmatrix} = \begin{pmatrix} F_{y0} \\ M_0 \end{pmatrix} - \frac{mhG_x}{g}\begin{pmatrix} 0 & 1 \\ 1 & 0 \end{pmatrix}\begin{pmatrix} G_{y0} \\ \dot{r}_0 \end{pmatrix} = \begin{pmatrix} F_{y0} \\ M_0 \end{pmatrix} + \frac{mhG_{x\_GVC}}{g}\begin{pmatrix} 0 & 1 \\ 1 & 0 \end{pmatrix}\begin{pmatrix} G_{y0} \\ \dot{r}_0 \end{pmatrix}$$ [Formula 12]

The Formula 12 means that the influence by the GVC acts upon both of the yaw motion and the lateral acceleration. Further, it can be recognized that the influence degree on the lateral acceleration is represented by a form of the product of the acceleration or deceleration and the yaw motion while the influence degree on the yaw motion is represented by a form of the product of the acceleration or deceleration and the lateral acceleration, and they influence each other in a cross coupled fashion. In the following, the moment control for stabilization is examined on the basis of the relationship just described.

In the GVC, an acceleration instruction is issued when the lateral jerk is in the negative when the car is leaving from a corner. However, on a test vehicle on which brake control is emphasized, only a deceleration instruction of the GVC is used. However, on the acceleration side, control is not performed but is entrusted to the driver ($G_{x\_DRV}$).

Accordingly, at a time of approach to a corner, automatic deceleration ($G_{x\_GVC}$) is performed by the GVC (given by the Formula 13 below).

$$\begin{pmatrix} mG_y \\ I_z \dot{r} \end{pmatrix} = \begin{pmatrix} F_{y0} \\ M_0 \end{pmatrix} + \frac{mhG_{x\_GVC}}{g}\begin{pmatrix} 0 & 1 \\ 1 & 0 \end{pmatrix}\begin{pmatrix} G_{y0} \\ \dot{r}_0 \end{pmatrix}$$ [Formula 13]

When a car is leaving a corner, acceleration ($G_{x\_DRV}$) is performed by the driver (given by the Formula 14).

$$\begin{pmatrix} mG_y \\ I_z \dot{r} \end{pmatrix} = \begin{pmatrix} F_{y0} \\ M_0 \end{pmatrix} - \frac{mhG_{x\_DRV}}{g}\begin{pmatrix} 0 & 1 \\ 1 & 0 \end{pmatrix}\begin{pmatrix} G_{y0} \\ \dot{r}_0 \end{pmatrix}$$ [Formula 14]

Here, it is also considered that not only the driver merely wants to accelerate the vehicle (increase the speed) but also the driver sets the $G_x$ to a positive value in the yaw motion of the Formula 14 to move the load to the rear wheels by load movement to reduce the yaw moment thereby to make it easy to return to the straightly traveling state.

According to this hypothesis, it is only necessary to apply a moment in a direction in which the yaw motion is stabilized at a timing similar to that by the driver. Further, the driver confirms that an instruction and a profile on the acceleration side of the GVC have acceleration forms similar to each other (refer to Non-Patent document 2).

In particular, driver assist control for the daily region +α becomes such that, "when an instruction on the acceleration side is issued in the GVC, a moment on the restoration side which reduces the yaw motion may be applied to the vehicle". Here, taking an analogy to the GVC instruction value of the Formula 1 into consideration, when $G_{x\_DRV} > 0$, namely, when $-\text{sgn}(G_y \cdot G_{y\_dot}) > 0$, the Formula 15 given below is obtained.

$$M_{+n} = \text{sgn}(G_y \cdot \dot{G}_y) \frac{C_{mn}}{1 + T_{mn}S}|\dot{G}_y|$$ [Formula 15]

It is to be noted that $C_{mn}$ is a proportional coefficient, and $T_{mn}$ is a primary delay time constant. This is the basic rule of the daily region +α control. Further, if the sgn term and the primary delay are omitted for simplification and the deceleration by the GVC and the moment control by the M+ are described in an integrated form, then the Formula 16 given below is obtained. It is to be noted that $C_{mn}$ is a proportional constant.

$$\begin{pmatrix} mG_y \\ I_z \dot{r} \end{pmatrix} = \begin{pmatrix} F_{y0} \\ M_0 \end{pmatrix} - \frac{mhC_{xy}G_{x\_GVC}}{g}\begin{pmatrix} 0 & 1 \\ 1 & 0 \end{pmatrix}\begin{pmatrix} G_{y0} \\ \dot{r}_0 \end{pmatrix} + \begin{pmatrix} 0 \\ M_{+n} \end{pmatrix}$$

$$= \begin{pmatrix} F_{y0} \\ M_0 \end{pmatrix} + \left\{ \frac{mhC_{xy}}{g}\begin{pmatrix} 0 & 1 \\ 1 & 0 \end{pmatrix}\begin{pmatrix} G_{y0} \\ \dot{r}_0 \end{pmatrix} - \begin{pmatrix} 0 \\ C_{mn} \end{pmatrix}\right\}|\dot{G}_y|$$ [Formula 16]

Figure 9:
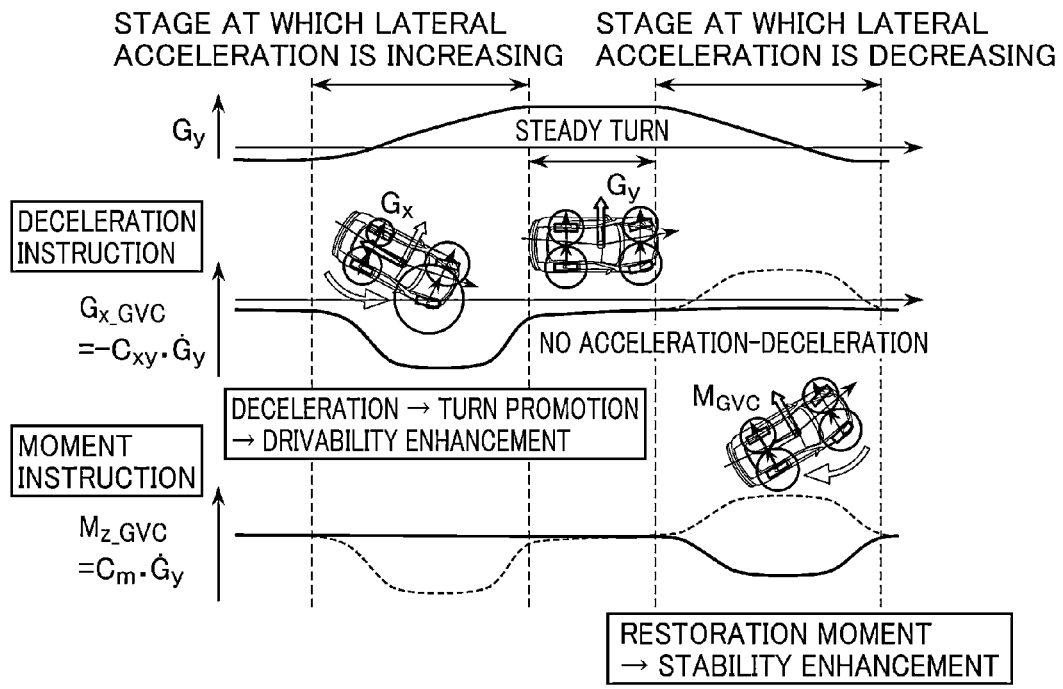
FIG. 9 is a diagram depicting a basic behavior of the moment control strategy.

After all, the deceleration and the stabilization moment are applied in response to the lateral jerk $G_{y\_dot}$. FIG. 9 denotes a diagram of a basic concept of the integrated control.

In the daily region, the correlation between the steering angle input of the driver and the vehicle behavior determined by calculation on a vehicle motion model is high. Further, the steering angle reflects an intention of the driver against the yawing motion and serves as a signal "whose phase leads" with respect the vehicle behavior to make phase compensation of the control system possible. Accordingly, when the moment control in the daily region is performed, the lateral jerk estimated using the vehicle motion model may be used for control in accordance with a GVC instruction similarly as in the case described in Patent Document 1.

(Note: here, a low friction region on a snow-covered road or the like is regarded as an operation range. When the driver operates the accelerator pedal to issue an acceleration request when the car is in turning leaving on an asphalt road or the like, also the moment control by a brake is cancelled immediately.)

Control in the Limit Region

Figure 10:
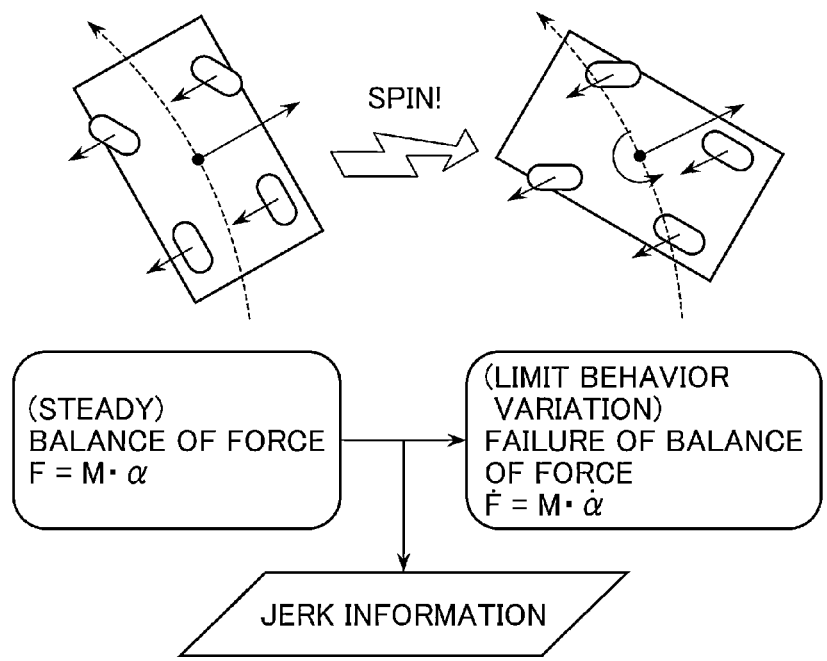
FIG. 10 is a diagram depicting a jerk at a time of behavior change.

When the balance in force is lost by some cause, a variation in acceleration, namely, a jerk, is generated (FIG. 10).

Figure 11:
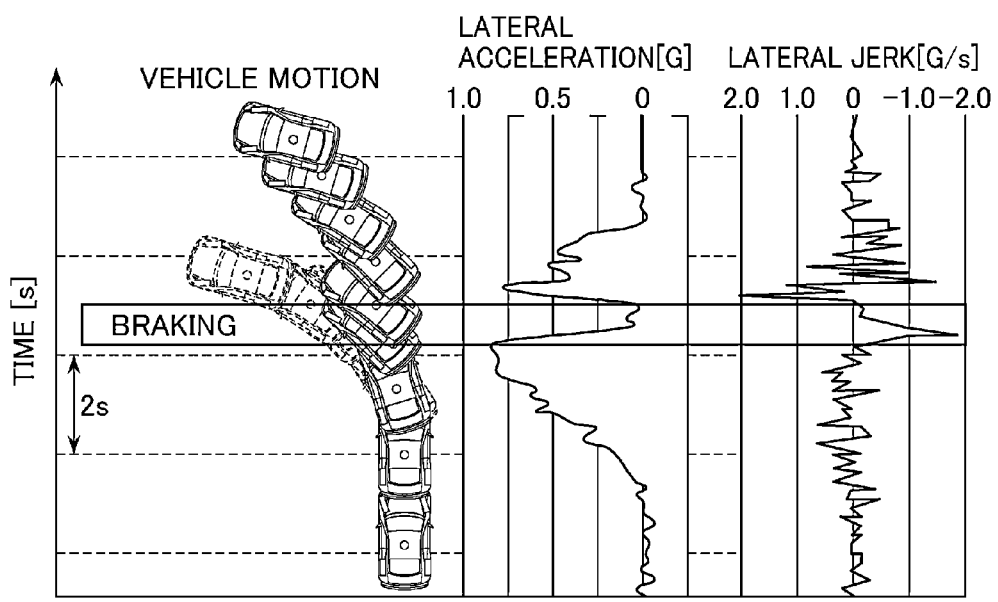
FIG. 11 is a diagram depicting jerk sensor measurement values at a time of vehicle spinning

FIG. 11 depicts measurement values of a jerk sensor when the side brake is pulled during turning to place the tire forces of the rear wheels into a saturate state thereby to cause a behavior variation (spin) and then the side brake is loosened. A manner in which, when the side brake is pulled, the lateral acceleration drops simultaneously and a jerk in the opposite direction to that of the lateral acceleration is generated can be seen from FIG. 11. If the side brake is loosened reversely, then the lateral acceleration gradually recovers and a jerk in the direction same as that of the lateral acceleration is generated. The knowledge obtained from here is that "the time at which the product of the acceleration and the jerk is in the negative is the time at which the vehicle begins to slip" and "the time at which the product is in the positive is the time at which the vehicle stops slipping and the motion is returning to the original state". This is not limited to the lateral motion, but applies also with regard to the longitudinal direction. In this manner, a situation in which the vehicle slips and another situation in which the vehicle restores from the slipping can be detected from the acceleration and the jerk.

Here, a behavior variation including spinning is examined a little more particularly. It is assumed that the vehicle is traveling stably in a state in which the angle defined by the direction in which the point of the center of gravity of the vehicle advances and the center line of the vehicle in the longitudinal direction, namely, the lateral slip angle β, is almost zero (β_dot=0). The yaw rate at this time is $r_0$, and the lateral acceleration of the vehicle has, where the vehicle speed is represented by $V_o$, a relationship of $G_y=V_o \times r_0$.

Here, if the vehicle starts spinning, then for a period of ΔT, $r_0$ and $β_0$ become $r_0 \to r_1$ ($>r_0$) and $β_0 \to β_1$, and $r_{1\_dot}$ and $β_{1\_dot}$ become $r_{1\_dot}=(r_1-r_0)/\Delta T>0$ and $β_{1\_dot}=β_1/\Delta T<0$, respectively. Where the yaw moment in the original restoration direction of the vehicle is small and besides control by the DYC or the like is not performed, if ΔT elapses further, then the lateral slip angle increases, resulting in occurrence of spinning of the vehicle.

The lateral acceleration can be represented in the following manner using the velocity V, the lateral slip angular velocity $β_{\_dot}$ and the yaw rate r.

$$G_y = V(\dot{β}+r) \dot{x} \dot{β} = β_{\_dot}$$ [Formula 17]

In the case of spinning, the lateral acceleration drops without fail in comparison with the lateral acceleration in a preceding steady state. This is because the positive increasing amount of r increases the lateral acceleration in the negative direction of β ($β_{1\_dot}<0$). Therefore, although the lateral jerk is given by the Formula 18, at a time of spinning, the value of the lateral jerk becomes a negative value.

$$\dot{G}_y = G_x(\dot{β}+r)+V(\ddot{β}+\dot{r})$$ [Formula 18]

The event of "the time at which the product of the acceleration and the jerk is in the negative is the time at which the vehicle begins to slip" is satisfied at the spinning.
(Postscript 1: the first term of the Formula 18 is a rotational component of the jerk and can be regarded also as a centrifugal jerk ($\approx r \cdot G_x$))
(Postscript 2: as the lateral slip angle increases, since the lateral acceleration which can be measured by the lateral acceleration sensor is a cos β component of the centrifugal force (acting in a direction toward the center of the turning route), the measurement value itself drops)

Now, if a sufficiently short period of time is considered and it is assumed that the longitudinal acceleration is fixed and also the velocity is fixed, then the lateral jerk can be considered as given by the following Formula 19.

$$\dot{G}_y = V\left\{\left(\dot{β} + \frac{G_x}{V}β\right) + \left(\dot{r} + \frac{G_x}{V}r\right)\right\} = A_1\ddot{β} + A_2\dot{β} + A_1\dot{r} + A_2 r$$ [Formula 19]

The lateral jerk can be regarded as the sum of the lateral slip angle variation, lateral slip angle, yaw angle acceleration or yaw angular velocity with a coefficient given by a value represented by the velocity or the ratio between the acceleration and the velocity. Although the ratio varies, it has at least a causal relationship with the lateral jerk, and it is considered that, when a lateral jerk is generated, the quantities of them are varying. In the preceding example of spinning, it is considered that the yaw rate and the yaw angular velocity increase and the lateral slip angle and the lateral slip angular velocity increase in the negative direction.

Figure 13:
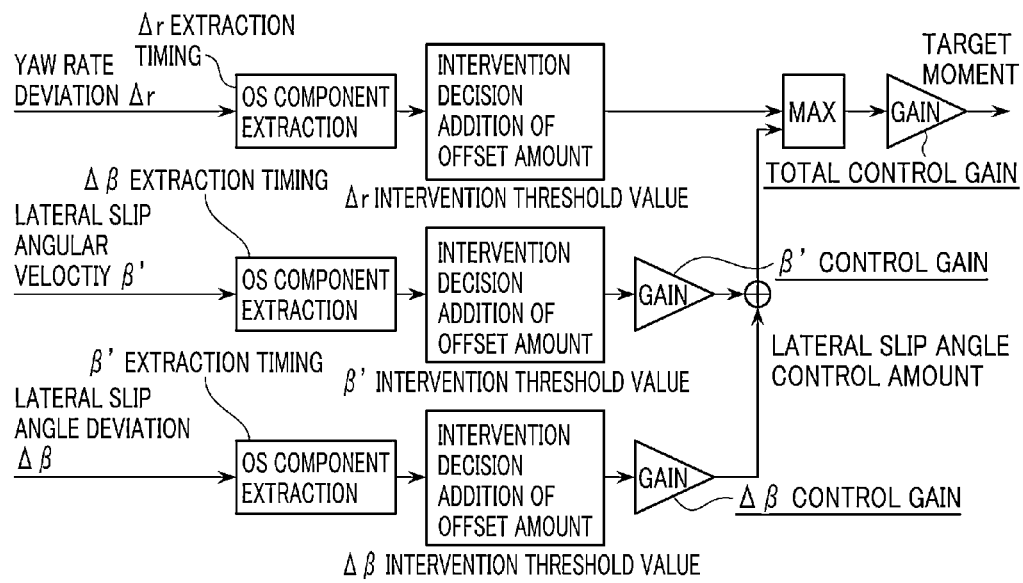
FIG. 13 is a diagram illustrating a relationship between a state quantity and a control amount (example of OS control).

FIG. 13 depicts an example of OS control of the ESC. In this logic, a target moment instruction is determined, on the basis of the deviation between the target yaw rate or lateral slip angle estimated using the vehicle model and the measurement yaw rate or the lateral slip angle estimated using an observer and the absolute value of the lateral angle, by addition or select high of the deviation and the absolute value.

Figure 14:
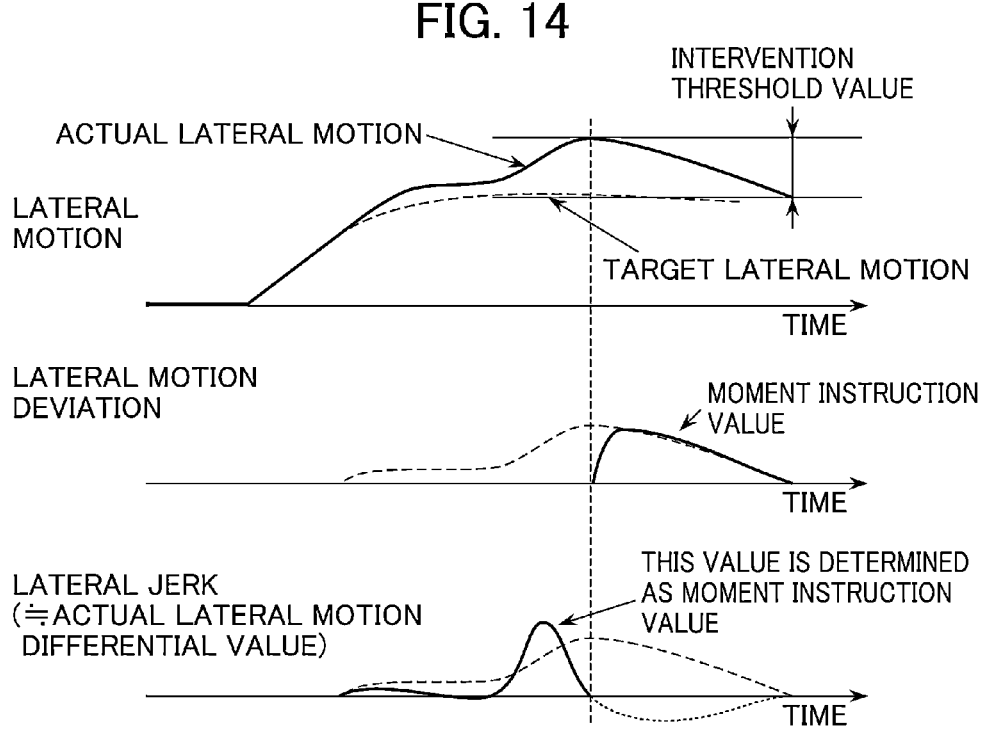
FIG. 14 is a diagram depicting time series data of a lateral jerk and a control amount (OS control).

The yaw rate and the lateral slip angle deviation are examined. FIG. 14 is a diagram depicting them in a generalized form. If the difference between the target lateral motion and the actual lateral motion, namely, the lateral motion variation, is extracted and indicated on the time axis, then a diagram at the middle stage is obtained. After a point of time at which the lateral motion variation exceeds an intervention threshold value therefore, a moment instruction is calculated on the basis of the values of them.

If the lateral motion deviation in the case where the target lateral movement is zero is considered, then this is the actual lateral motion itself. It is considered that the time differential value of the lateral movement deviation at this time can be represented by an actual jerk (lower stage in FIG. 14). Further, where the target lateral movement is a sufficiently slow movement, this can be regarded as an equilibrium point and the lateral motion deviation can be regarded as a fine disturbance from the equilibrium point. Since the time differential value at the equilibrium point is zero, it is considered that the time differential value of the lateral motion deviation still is a time differential value of the actual lateral motion. In the following description, the lateral jerk is regarded as an instruction value for the moment control.

As described hereinabove, it can be considered that "the time at which the product of the acceleration and the jerk is in the negative is the time at which the vehicle begins to slip" or "the time is the time at which the vehicle begins to spin". At this time, a moment in the opposite direction (restoration direction) to that of spinning may be applied to the vehicle. If the moment instruction at this time is formulated most directly, then the Formula 20 is obtained.

$$M_z = \begin{cases} 0 & (\text{if: } -\text{sgn}(G_y \cdot \dot{G}_y) \leq 0) \\ -C_{ml}|\dot{G}_y| & (\text{if: } -\text{sgn}(G_y \cdot \dot{G}_y) > 0) \end{cases}$$ [Formula 20]

It is to be noted that $C_{ml}$ is a proportional constant. This is not contradictory to that, in regard to the daily region +α described in the preceding section, "when an instruction on the acceleration side is issued in the GVC, a moment on the restoration side for reducing the yaw motion may be applied to the vehicle". Accordingly, if the proportional constants $C_{mn}$ above and $C_{ml}$ are selected appropriately, then seamless integrated control from the daily region to the limit region can be configured (naturally, also the ESC intervenes on the basis of the lateral slip information).

To Make M+ Control Seamless

Figure 15:
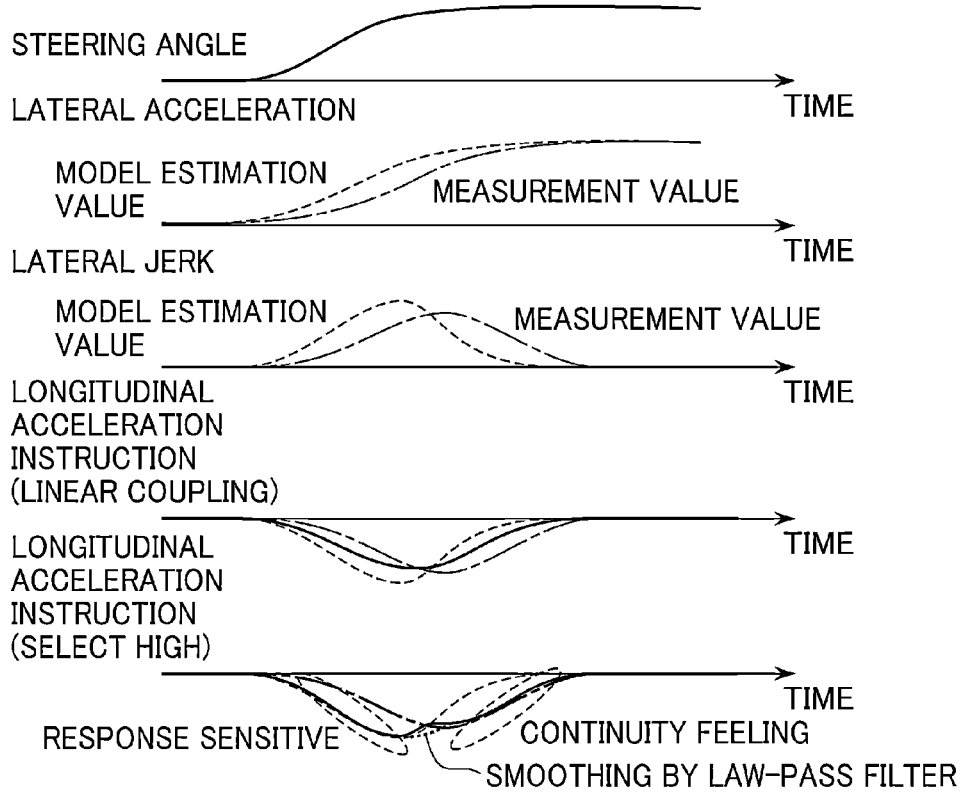
FIG. 15 is a diagram depicting comparison between a model estimation lateral jerk value and a measurement value.

Also in the GVC control till now, control has been performed using a model estimation lateral jerk value estimated using a vehicle motion model and a measurement value as depicted in FIG. 15 (refer to Patent Document 3). The jerk information of an early phase by model estimation is effective to achieve, by load movement to the front wheels by deceleration through starting of the control at an early stage, improvement in responsive feeling to steering. Further, it was confirmed that, by performing deceleration associated also with a vehicle lateral motion which occurs late after steering is stopped, although this is principally for a low friction road, abrupt ending of the control does not occur and sense of continuity is obtained.

Figure 16:
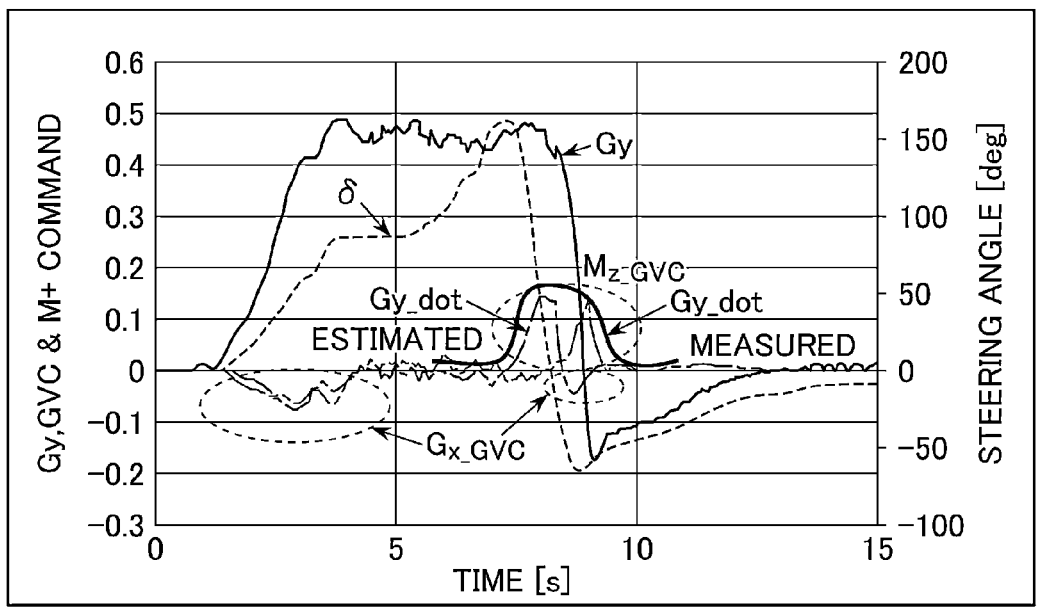
FIG. 16 is a diagram illustrating a relationship between model estimation and a measurement value (actual measurement example).

It was determined to use a similar technique also when it was tried to make the M+ control from the daily region to the limit region seamless. FIG. 16 indicates a result of a simulation test on a compacted snow road. Although actual control was not performed, a steering angle and a vehicle behavior when spinning is induced by an L turn and an instruction value calculated on the basis of the steering angle and the vehicle behavior are indicated. Although the GVC instruction on the deceleration side was regarded as select high (as viewed in absolute value) to construct an instruction value already, at this time, also as regards the instruction value on the acceleration side, it was determined to obtain a moment instruction value ($M_{z\_GVC}$) through select high of the instruction value based on the model estimation ($G_{y\_dot}$ Estimated) and the instruction value based on the measured value ($G_{y\_dot}$ Measured). By adopting such a configuration as just described, it is possible to obtain a control strategy complying with such a "basic policy for a moment control strategy" as described hereinabove. Further, although a deceleration instruction by model estimation appears around 8 seconds, since the GVC and the moment instruction do not interfere with each other, also it is possible to carry out both controls. At this time, the operation is such that the vehicle is decelerated while a moment on the restoration side is applied.

Integrated Control (Hybrid+ Enhanced Control)

Although the brake control by the ESC is focused above, here, a situation in which four-wheel independent braking and driving control is possible is considered, and this is referred to as Hybrid+ Enhanced control. Where the four wheels can be braked and driven independently of one another, the left and right braking/driving sum can be made fixed while a moment is generated from a difference between the left and right wheels in driving-braking. As a result, the moment can be controlled arbitrarily while the acceleration and the deceleration are controlled arbitrarily.

In addition to direct control of the moment by providing a difference in braking or driving forces between the left and right wheels, the moment can be controlled, although indirectly, using the difference in lateral forces between the front and rear wheels by load movement between the front and rear wheels which occurs by acceleration or deceleration during turning as depicted in FIG. 17 (B1, B2). Although, in the brake control described hereinabove, even if it is tried to control the moment, also a deceleration appears naturally, if also the driving forces can be controlled, then by applying driving forces equally to all wheels as depicted in FIGS. 17(A1) and 17(A2), only the moment can be controlled without involving acceleration or deceleration. In such a situation as just described, the acceleration or deceleration is controlled by an acceleration behavior of the driver and the GVC, and the moment can be controlled by the M+ and the ESC (DYC) on the basis of the lateral slip information. Here, if the M+ control is expanded from the control only of the stable side of the Formula 20 to turn promotion control when the car is turning in, then this is represented by the Formula 21.

$$M_{z+} = \text{sgn}(G_y \cdot \dot{G}_y) \frac{C_{mnl}}{1 + T_{mnl}s} |\dot{G}_y| \qquad \text{[Formula 21]}$$

However, it is necessary to set the lateral acceleration gain $C_{mnl}$ to an appropriate value over a range from the normal region to the limit region.

Figure 18:
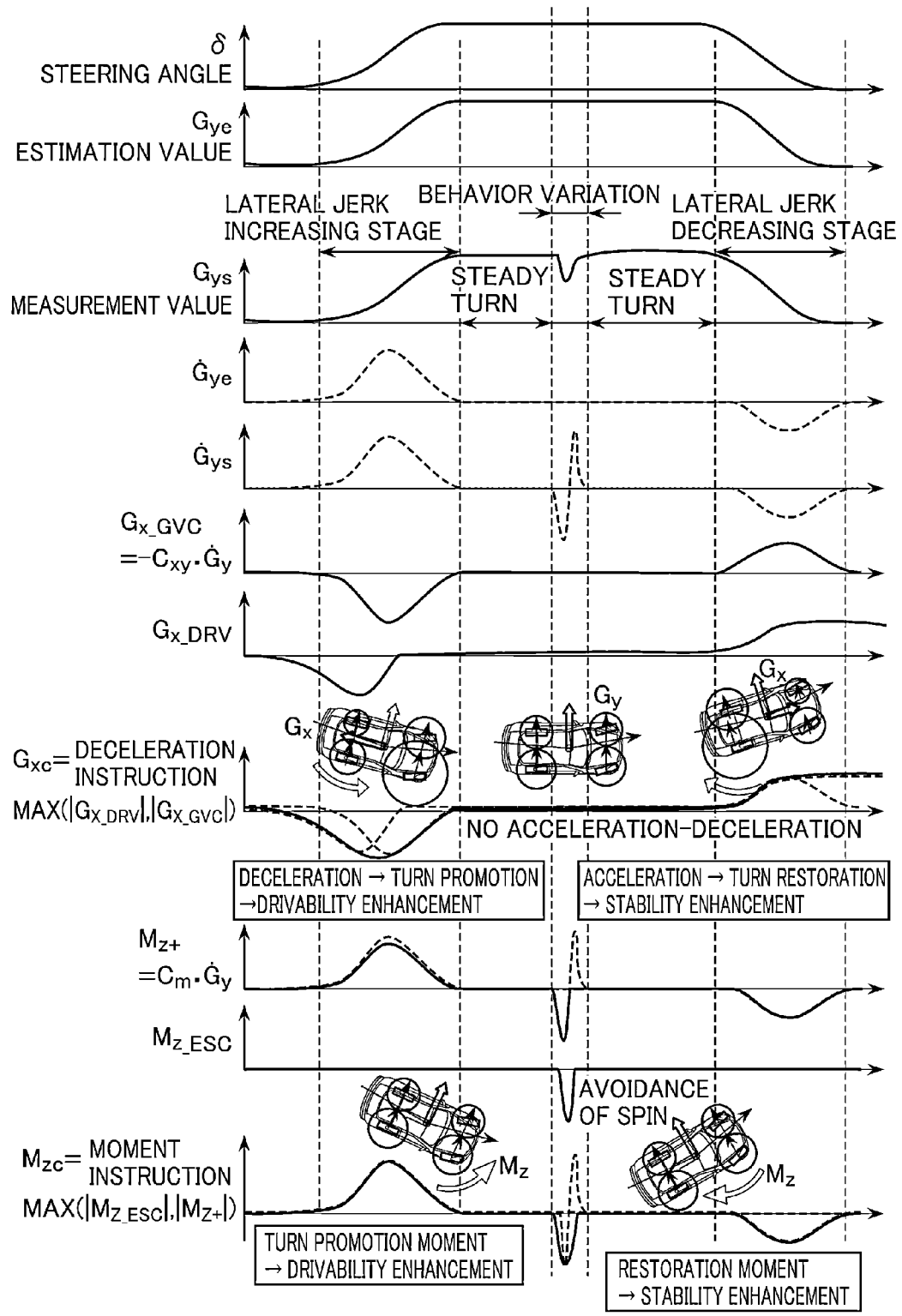
FIG. 18 is a diagram depicting operation states of three modes of the present invention.

If such a configuration as described above is applied, then such Hybrid+ Enhanced control as depicted in FIG. 18 can be implemented. FIG. 18 indicates, from above, as follows: a driver steering angle; a lateral acceleration estimation value $G_{ye}$; a lateral acceleration measurement value $G_{ys}$; time rates of change $G_{ye\_dot}$ and $G_{ys\_dot}$ of the values $G_{ye}$ and $G_{ys}$ (estimation and detection are hereinafter described); an acceleration/deceleration instruction value by the GVC based on the lateral jerk; an acceleration/deceleration instruction value of the driver estimated from the operation amount of the brake/accelerator pedal; a substantial deceleration instruction ($G_{xc}$) in which arbitration of the acceleration/deceleration instruction of the driver and the acceleration/deceleration instruction of the GVC is performed here by the technique that one of the two acceleration/deceleration instructions which has a higher absolute value is adopted by arbitration means; an M+ yaw moment instruction value ($M_{z\_GVC}$) based on a lateral jerk, especially on the time rate of change $G_{ys\_dot}$ of the lateral acceleration measurement value; a yaw moment instruction value (although this exhibits a shape similar to that of the lateral jerk, it becomes a signal delayed in comparison with $M_{z\_GVC}$ from a relationship with a threshold value and so forth) $M_{z\_ESC}$ by the ESC; and a substantial moment instruction value (Mzc) in which arbitration of the moment instruction value of the ESC and the M+ yaw moment instruction value ($M_{z\_GVC}$) is performed here by the technique which adopts that one of the two moment instruction values which has a higher absolute value.

A basic hypothetical scene of FIG. 18 is similar to that of FIG. 1. A general traveling scene that the vehicle approaches and leaves a corner along a straight road A, a transit section B, a steady turning section C, another transit section D and another straight road E is assumed. However, FIG. 18 indicates a situation that such a behavior variation in a spinning direction as depicted in FIG. 11 arising from a sudden variation of the road surface or the like midway of turning (for example, in the proximity of the point 4 in FIG. 1) occurs. At this time, a situation is indicated that, although the driver steering angle does not vary (and therefore also the lateral acceleration estimation value $G_{ye}$ assumes a steady value), the measurement lateral acceleration drops once and a behavior variation occurs.

Although a lateral jerk is generated in such a situation as just described, by adopting the method disclosed in JP-2011-105096-A, it is possible to prevent, when it is decided that the lateral jerk increases to the proximity of the friction limit, the GVC instruction value ($G_{x\_GVC}$) from being generated in the proximity of a behavior changing point by correcting the absolute value of the longitudinal acceleration instruction value of the GVC to zero or a value lower than that before the correction.

Figure 12:
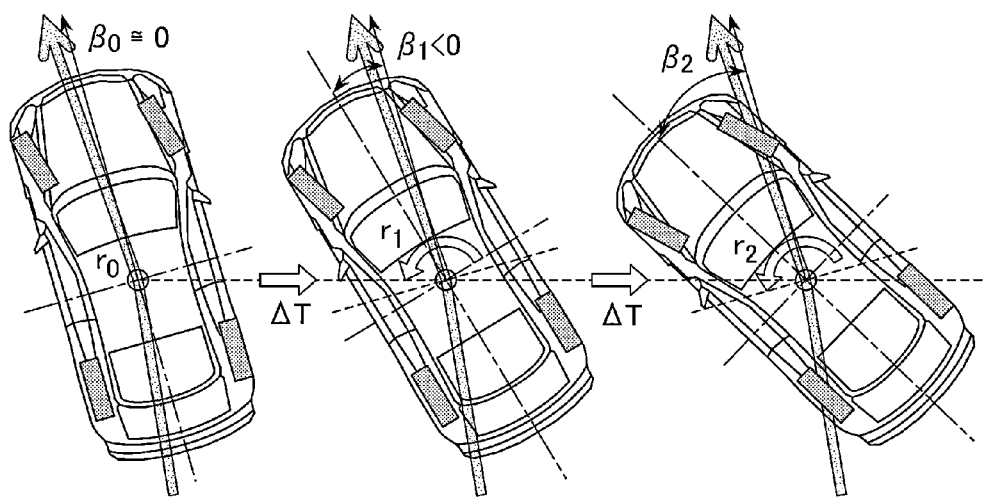
FIG. 12 is a diagram depicting a mode of a lateral slip angle and a yaw rate at a time of vehicle spinning

Further, in FIG. 18, the deceleration instruction $G_{x\_DRV}$ of the driver is generated (brake beforehand) before the steering angle is increased, and the brake is released before steady turning and the driver has no acceleration/deceleration intention during steady turning and also during occurrence of a behavior variation. Further, when the car is leaving the corner, the brake begins to be released, and also after the corner is left, the vehicle is accelerated. If the brake is released before steady turning, the load having moved to the front wheels is lost. Thus, promotion of the yaw motion and the lateral acceleration depicted in FIG. 12 cannot be expected, resulting in that the vehicle may be displaced to the outer side from the target line. With the substantial deceleration instruction $G_{xc}$, both of deceleration from a point before a corner by the driver and a turn promotion effect by the GVC are obtained. When the car is leaving a corner, a stabilization improvement effect by the GVC acts, and simultaneously, acceleration up to the speed intended by the driver can be implemented.

Regarding the moment control, since the M+ yaw moment instruction value is generated basically on the basis of the lateral jerk, a turn promotion moment and a restoration moment are generated at the time of starting a turn and leaving the turn. Therefore, improvement in drivability and improvement in stability can be achieved. What is to be noticed here is that, if the moment instruction value is rendered operative from the normal region, then the phase of the yaw response to the steering angle input advances by a great amount, and generation of a lateral acceleration which serves as a roll moment is delayed relatively. Consequently, in comparison with a state where no control is involved, a variation is provided to the consistency of the combination of the yaw and the roll, and the anti-dive lift force of the suspension is rendered unbalanced between the left and the right, resulting in generation of a vehicle behavior variation at the time of control. Accordingly, at least at a place where the coefficient of friction is high such as a dry asphalt road, such countermeasures as to lower the gain or not to perform control only for the turn promotion side may be taken.

Further, in a situation in which a behavior variation occurs, a lateral jerk of a sign opposite to that of the lateral acceleration is generated due to a variation in balance between the sum total of the tire lateral forces and the centrifugal forces as depicted in FIG. 11. Accordingly, by controlling the yaw moment on the basis of the Formula 21, spin prevention or reduction can be anticipated. What is to be noticed here is the control instruction when the vehicle comes to be stabilized, namely, when the lateral acceleration restores (in the figure, positive values are assigned for a turn promotion direction). At this time, in the case of a vehicle having a small static margin, there is the possibility that the vehicle which comes to be stabilized once may be destabilized. In that case, a filter process may be applied so that such a moment instruction of a high frequency in the turn positive direction may not be accepted. Alternatively, in the first place, a moment instruction in the turn positive direction may not be accepted so that only a restoration moment may be exclusively applied as depicted in FIG. 9.

In a situation that a behavior variation occurs, naturally a moment instruction by the ESC operates. Accordingly, since the vehicle is stabilized by a restoration moment substantially same as the behavior variation by the M+ instruction, the moment instruction by the ESC decreases. After all, by selecting a higher one of the M+ yaw moment instruction value and the yaw moment instruction value by the ESC as $M_{zc}$, control shortage does not occur and the safety can be secured.

Figure 19:
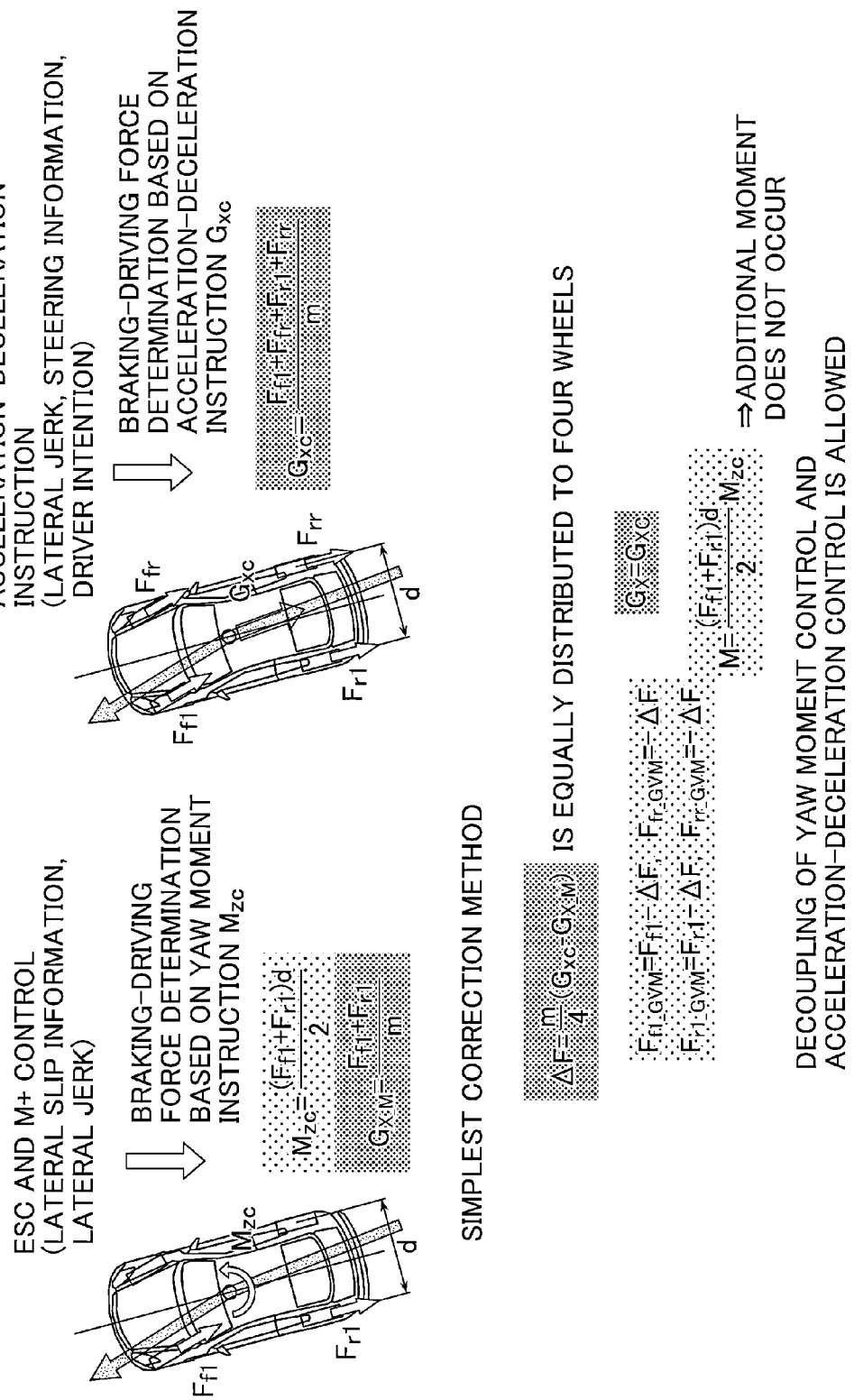
FIG. 19 is a diagram depicting decoupling of yaw moment control and acceleration/deceleration control of the present invention.

It is to be noted that, since four-wheel independent braking and driving control is possible, by distributing driving forces equal to one side braking forces generated by the moment instruction value equally to the four wheels, it is possible to prevent occurrence of acceleration and deceleration even if the moment is controlled. This mechanism is depicted in FIG. 19.

If a moment instruction $M_{zc}$ based on lateral slip information and a lateral jerk is determined by the ESC and the M+ control (in FIG. 19, a counterclockwise moment), then, in order to implement this, braking/driving forces (whose sign is the negative) of Ffl and Frl are applied to the front and rear wheels on the left side so as to satisfy a relationship of the Formula 22.

$$M_{zc} = \frac{(F_{fl} + F_{rl})d}{2} \quad \text{[Formula 22]}$$

Consequently, a deceleration represented by the Formula 23 is generated on the vehicle.

$$G_{x\_M} = \frac{F_{fl} + F_{rl}}{m} \quad \text{[Formula 23]}$$

On the other hand, if an acceleration/deceleration instruction $G_{xc}$ based on a lateral jerk, steer information and a driver's intention is determined in accordance with the GVC and a driver acceleration/deceleration instruction (in FIG. 19, deceleration), then in order to implement this, braking/driving forces Ffl, Ffr, Frl and Frr are applied to the four wheels so as to satisfy a relationship of the Formula 24 (here, a situation in which four-wheel independent braking and driving control is possible is assumed).

$$G_{xc} = \frac{F_{fl} + F_{fr} + F_{rl} + F_{rr}}{m} \quad \text{[Formula 24]}$$

Here, as the simplest correction method for implementing non-interference of the yaw moment control and the acceleration/deceleration control, a method of the Formula 25 is available.

$$\Delta F = \frac{m}{4}(G_{xc} - G_{x\_M}) \quad \text{[Formula 25]}$$

If this is distributed equally to the four wheels to determine braking/driving forces for the four wheels newly, then they are represented by the Formula 26.

$$F_{fl\_GVM} = F_{fl} - \Delta F, F_{fr\_GVM} = -\Delta F$$

$$F_{rl\_GVM} = F_{rl} - \Delta F, F_{rr\_GVM} = -\Delta F \quad \text{[Formula 26]}$$

If the braking/driving control is performed in this manner, then the value of the acceleration/deceleration control becomes equal to the initial value as following Formula 27.

$$G_x = G_{xc} \quad \text{[Formula 27]}$$

Also the value of the moment control becomes the initial instruction value as following Formula 28.

$$M = \frac{(F_{fl} + F_{rl})d}{2} = M_{zc} \quad \text{[Formula 28]}$$

Complete decoupling of the yaw moment control and the acceleration/deceleration control can be implemented.

Especially, when the acceleration/deceleration Gxc is controlled to zero, since ΔF becomes negative in accordance with the Formula 24, the left side wheels are braked and the right side wheels are driven from the Formula 25. Where there is some restriction to hardware (implemented, for example, only with a deceleration actuator of the ESC or the like), some deceleration feeling is involved.

As described above, a motion controlling apparatus for a vehicle, in which driving forces or braking forces of wheels of the vehicle can be controlled independently of each other, includes: vehicle acceleration/deceleration instruction (GVC instruction) calculation means that determines a vehicle acceleration/deceleration instruction value on the basis of a lateral jerk ($G_{y\_dot}$) of the vehicle; first vehicle yaw moment instruction (M+ instruction) calculation means that determines a vehicle yaw moment instruction value on the basis of the lateral jerk of the vehicle; and second vehicle yaw moment instruction calculation means (ESC instruction) that determines a vehicle yaw moment instruction value from lateral slip information of the vehicle. Further, the motion controlling apparatus includes: a first mode that generates, on the basis of the vehicle acceleration/deceleration instruction value determined from the vehicle lateral jerk by the vehicle acceleration/deceleration instruction calculation means, substantially equal driving forces or braking forces (equal braking pressures and no difference between left and right driving forces, or no difference between left and right driving forces) on left and right wheels from among four wheels of the vehicle to control acceleration/deceleration of the vehicle; a second mode that generates, on the basis of the vehicle yaw moment instruction (M+ instruction) value determined by the first vehicle yaw moment instruction calculation means using the vehicle lateral jerk, different driving or braking forces on the left and right wheels from among the four wheels of the vehicle to control a yaw moment of the vehicle; and a third mode that generates, on the basis of the vehicle yaw moment instruction (ESC instruction) value determined by the second vehicle yaw moment instruction calculation means using the vehicle lateral slip information, different driving or braking forces on the left and right wheels from among the four wheels of the vehicle to control the yaw moment of the vehicle. Consequently, the yaw moment control in accordance with the M+ (moment plus) instruction functions as control in the transit region in the cooperation control of the G-Vectoring and the ESC (DYC). Thus, motion control for a vehicle which can achieve improvement in drivability, stability and driving comfort, which could have been achieved only by incorporation into the ESC, can be implemented in a plurality of embodiments, and the technology and apparatus can be provided to a greater number of drivers.

Now, two embodiments are described with regard to working examples which indicate a hardware configuration and so forth.

WORKING EXAMPLE 1

Figure 23:
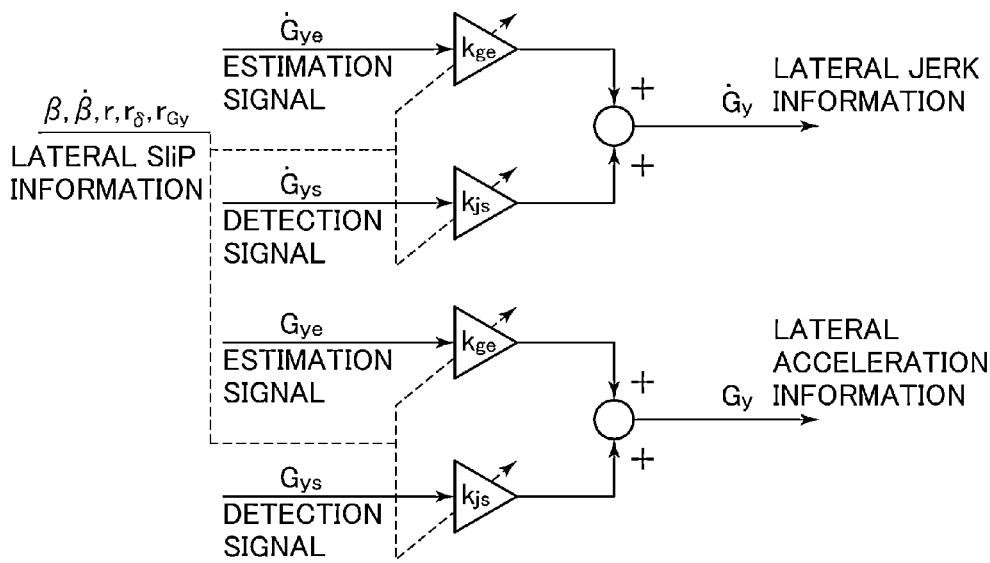
FIG. 23 is a diagram depicting a concept of mutual complement of an estimation signal and a measurement signal.

FIG. 23 depicts a general configuration of a working example 1 of the motion controlling apparatus for a vehicle of the present invention.

In the present working example, a vehicle 0 is configured from a so-called by-wire system and does not include mechanical coupling between a driver and a steering mechanism, an acceleration mechanism and a deceleration mechanism.

<Driving>

The vehicle 0 is a four-wheel drive vehicle (All Wheel Drive: AWD vehicle) wherein a left rear wheel 63 is driven by a left rear wheel motor 1 and a right rear wheel 64 by a right rear wheel motor 2 while a left front wheel 61 is driven by a left front wheel motor 121 and a right front wheel 62 by a right front wheel motor 122.

Here, especially as regards a difference between sources of power such as electric motors and internal combustion engines, the sources of power are configured such that, as the most preferable example which indicates the present invention or by combination with the four-wheel independent brakes hereinafter described, the driving forces and the braking forces for the four wheels can be controlled freely. In the following, the configuration is described in detail.

On each of the left front wheel 61, right front wheel 62, left rear wheel 63 and right rear wheel 64, a brake rotor and a wheel speed detection rotor are mounted, and a wheel speed pickup is mounted on the vehicle side so that the wheel speed of each wheel can be detected. The operation amount of an accelerator pedal 10 by the driver is detected by an accelerator position sensor 31 and is subjected to an calculation process by a central controller 40 serving as control means through a pedal controller 48. The central controller 40 controls driving forces and/or braking forces for each of the four wheels independently, and the calculation process of the central controller 40 includes also the GVC, ESC and M+ control for "improving the drivability and the stability" as the object of the present invention. A power train controller 46 controls output power of the left rear wheel motor 1, right rear wheel motor 2, left front wheel motor 121 and right front wheel motor 122 in response to the amount.

An accelerator reaction force motor 51 is connected to the accelerator pedal 10, and reaction control is performed by the pedal controller 48 on the basis of an calculation instruction of the central controller 40.

<Braking>

A brake rotor is provided for each of the left front wheel 61, right front wheel 62, left rear wheel 63 and right rear wheel 64, and a caliper for sandwiching the brake rotor with pads (not depicted) to decelerate the wheel is mounted on the vehicle body side. The brake system is of the electro-mechanical type having an electric motor for each caliper.

Each caliper is controlled by brake controllers 451 (for the front left wheel), 452 (for the front right wheel) or 453 (for each of the rear wheels) basically on the basis of an calculation instruction of the central controller 40. Also a brake pedal reactive force motor 52 is connected to the brake pedal 11, and reactive force control is performed by the pedal controller 48 on the basis of an calculation instruction of the central controller 40.

<Integrated Control of Braking and Driving>

In the present invention, in order to "improve the drivability and the stability", the GVC generates braking/driving forces substantially equal between the left and the right wheels, whereas the ESC and the M+ generate braking forces or driving forces which are different between the left and right wheels.

An integrated control instruction in such a situation as described above is determined in an integrated manner by the central controller 40, and appropriate control is performed through the brake controllers 451 (for the front left wheel and the front right wheel) and 452 (for the rear wheels), power train controller 46, left rear wheel motor 1, right rear wheel motor 2, left front wheel motor 121 and right front wheel motor 122.

<Steering>

The steering system of the vehicle 0 has a steer-by-wire structure which does not have a mechanical coupling between the steering angle of the driver and the tire turning angle. The steering system is configured from a power steering 7 including a steering angle sensor (not depicted) in the inside thereof, a steering 16, a driver steering angle sensor 33, and a steering controller 44. The steering amount of the steering 16 by the driver is detected by the driver steering angle sensor 33 and is subjected to an calculation process by the central controller 40 through the steering controller 44. Then, the steering controller 44 controls the power steering 7 in response to the amount obtained by the calculation process.

Further, a steering reactive force motor 53 is connected to the steering 16, and reactive force control is performed by the steering controller 44 on the basis of an calculation instruction of the central controller 40.

The operation amount of the brake pedal 11 by the driver is detected by a brake pedal position sensor 32 and is subjected to an calculation process by the central controller 40 through the pedal controller 48.

<Sensors>

Now, a motion sensor group of the present invention is described.

As sensors for measuring a movement of the vehicle in the present working example, an absolute vehicle speedometer, a yaw rate sensor, an acceleration sensor and so forth are incorporated. In addition, as regards the vehicle speed and the yaw rate, estimation by a wheel speed sensor is performed, and as regards the yaw rate and the lateral acceleration, estimation using the vehicle speed, steering angle and a vehicle motion model and so forth are performed simultaneously.

A millimeter wave ground vehicle speed sensor 70 serving as external field information detection means is incorporated in the vehicle 0 such that it can detect obstacle information, preceding vehicle information and succeeding vehicle information and can further detect the velocity $V_x$ in the longitudinal direction and the velocity $V_y$ in the lateral direction independently of each other. Further, to the brake controllers 451 and 452, such wheel speeds of the wheels as described hereinabove are inputted. An absolute vehicle speed can be estimated by an averaging process of the wheel speeds of the front wheels (non-driving wheels) from among the wheel speeds of the four wheels.

The present invention is configured such that, using the method disclosed in JP-1993-16789-A, the wheel speeds and a signal of an acceleration sensor for detecting the acceleration in the vehicle longitudinal direction are added so that, even when the wheel speeds of the four wheels drop at the same time, the absolute vehicle speed ($V_x$) may be measured accurately.

Also a configuration which calculates a difference between the speeds of the left and right wheels to estimate the yaw rate of the vehicle body is provided, by which improvement of the robust property of a sensing signal is achieved. Those signals are always monitored as shared information by the central controller 40. The estimated absolute vehicle speed is compared with and referred to by a signal of the millimeter wave ground vehicle speed sensor 70 such that, when some of the signals suffers from a trouble, the signals complement each other.

Figure 20:
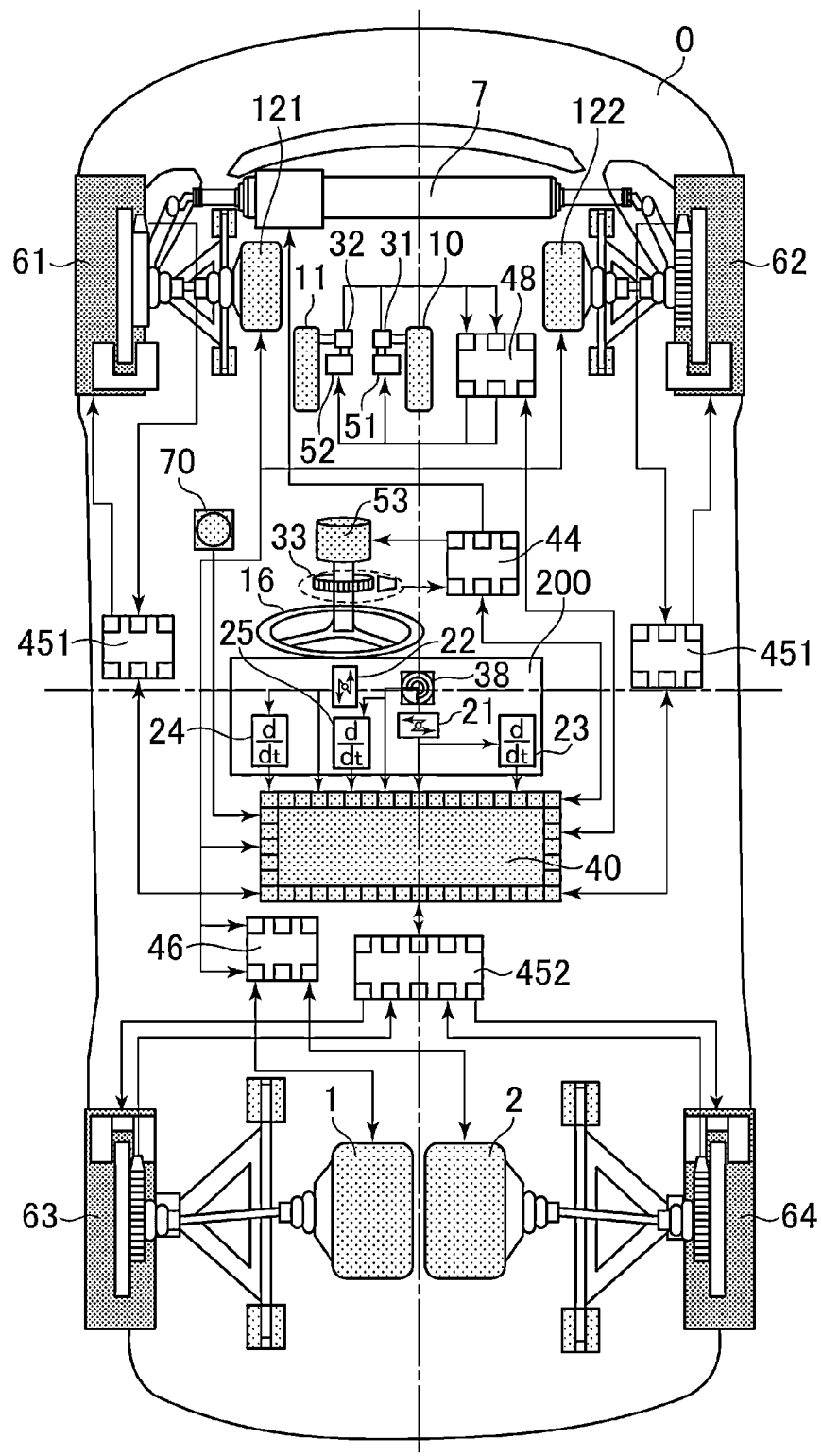
FIG. 20 is a diagram depicting a general configuration of a first working example of a motion controlling apparatus for a vehicle according to the present invention.

As depicted in FIG. 20, a lateral acceleration sensor 21, a longitudinal acceleration sensor 22 and a yaw rate sensor 38 are arranged in the proximity of the center of gravity.

Further, differentiating circuits 23 and 24 for differentiating the outputs of the individual acceleration sensors to obtain jerk information are incorporated.

Further, a differentiating circuit 25 for differentiating the sensor output of the yaw rate sensor 38 to obtain a yaw angular acceleration signal is incorporated.

While it is depicted such that, in the present working example, a differentiating circuit is installed in each sensor in order to definitely indicate the presence of the differentiating circuit, actually the acceleration signals may be subjected to a differentiation process after they are inputted directly to the central controller 40 and subjected to various calculation processes by the central controller 40. A yaw rate estimated from the wheel speed sensors described above may be used such that it is subjected to a differentiating process by the central controller 40 to obtain a yaw angular acceleration of the vehicle body.

Further, a sensor which includes a differentiating circuit and has a jerk output obtained by directly differentiating a signal from a detection element which increases in proportion to an acceleration may be used in an acceleration sensor unit of the MEMS type, which exhibits a remarkable progress in recent years. There are many cases in which an acceleration sensor output signal is a signal after passing a low-pass filter for smoothing a signal.

A jerk signal can be obtained which exhibits a less phase delay and a higher degree of accuracy than those where a signal which passes through a low-pass filter once is differentiated again in order to obtain a jerk.

Or, the jerk sensor which is disclosed in JP-2002-340925-A and can directly detect a jerk may be used.

Although a longitudinal acceleration sensor, a lateral acceleration sensor, a yaw rate sensor, a differentiator and so forth are depicted explicitly and independently for the convenience of illustration on the drawings, they may be configured as a combined sensor 200 which has functions of the sensors accommodated in a housing such that longitudinal and lateral accelerations, a jerk, a yaw rate and a yaw angular acceleration are outputted directly from the combined sensor 200. Furthermore, a function for calculating and outputting an acceleration instruction value (GVC) associated with the lateral motion of the Formula 1 or a moment instruction value (M+) of the Formula 21 may be integrated with the combined sensor.

Further, the instructions may be sent on a CAN signal to a brake unit or a driving unit so as to perform the GVC and the moment plus control.

If such a configuration as just described is applied, then only if the combined sensor is placed on a vehicle, the GVC and the moment plus control can be implemented using an existing brake unit and driving unit. Furthermore, seamless control from the normal region to the limit region can be implemented by the ESC.

Further, in the present working example, also a method for estimating the lateral acceleration Gy and the lateral jerk $G_{y\_dot}$ is adopted. As a method for the estimation, they are estimated on the basis of the steering angle and the vehicle speed. Or, they are estimated from the yaw rate detected by the yaw rate sensor and the vehicle speed.

Figure 21:
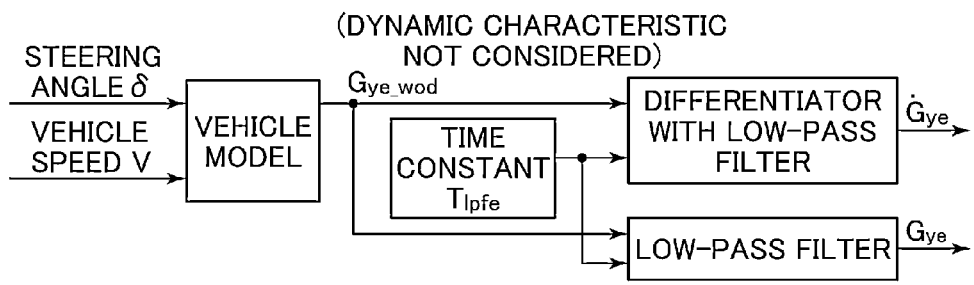
FIG. 21 is a diagram depicting estimation of a vehicle lateral acceleration and jerk for which a vehicle model is used.

A method for estimating the lateral acceleration estimation value $G_{ye}$ and the lateral jerk estimation value $G_{ye\_dot}$ from the steering angle 6 is described with reference to FIG. 21.

First, on a vehicle lateral motion model, the steering angle δ [deg] and the vehicle velocity V [m/s] are inputted, and the yaw rate r at a time of steady circular turning with dynamic characteristics omitted is calculated in accordance with the following Formula 29.

$$r = \frac{1}{1+AV^2}\frac{V}{l}\delta \quad \text{[Formula 29]}$$

In the formula above, the stability factor A and the wheel base l are parameters unique to the vehicle and are values determined experimentally.

Meanwhile, the lateral acceleration $G_y$ of the vehicle can be represented by the Formula 30 given below using the vehicle velocity V, the lateral slip angle rate of change $\beta_{\_dot}$ of the vehicle and the yaw rate r.

$$G_y = V(\dot{\beta}+r) \approx V \cdot r \quad \text{[Formula 30]}$$

$\beta_{\_dot}$ represents a motion within a linear range of the tire force and is a quantity which is so small that it can be omitted.

Here, the yaw rate r whose dynamic characteristics are omitted as described above and the vehicle velocity V are multiplied to calculate the lateral acceleration $G_{ye\text{-}wod}$. This lateral acceleration does not take dynamic characteristics of the vehicle which has a response delay characteristic in a low frequency region into consideration.

This arises from the following reason. To obtain the lateral jerk information $G_{y\_dot}$ of the vehicle, the lateral acceleration $G_y$ is differentiated for discrete time. In short, it is necessary to perform a time differentiating process of a lateral acceleration measured by a lateral acceleration sensor to calculate the lateral jerk information $G_{y\_dot}$. At this time, a noise component is strengthened. Although it is necessary, in order to use the signal in control, to pass the signal through a low-pass filter (LPF), this gives rise to a phase delay. Therefore, a method that an acceleration from which dynamic characteristics are removed and which has an earlier phase than an original acceleration is calculated and then subjected to discrete differentiation, after which a resulting value is passed through an LPF of a time constant $T_{lpfe}$ is adopted to obtain a jerk. This may be considered that dynamic characteristics of the lateral acceleration is represented by a delay by the LPF and the resulting acceleration is merely differentiated. Also the lateral acceleration $G_y$ is passed through an LPF of the same time constant $T_{lpf}$. Consequently, the dynamic characteristics are provided also to the acceleration, and although a figure is omitted, it has been confirmed that, within the linear range, an actual acceleration response can be represented well.

As described above, the method of calculating the lateral acceleration $G_y$ and the lateral jerk $G_{y\_dot}$ using a steering angle is advantageous in that it suppresses the influence of noise and also the response delay of the lateral acceleration $G_y$ and the lateral jerk $G_{y\_dot}$ is reduced.

However, since the present estimation method omits lateral slip information of the vehicle and ignores a nonlinear characteristic of the tires, when the lateral slip angle becomes great, it is necessary to measure and utilize an actual lateral acceleration of the vehicle.

Figure 22:
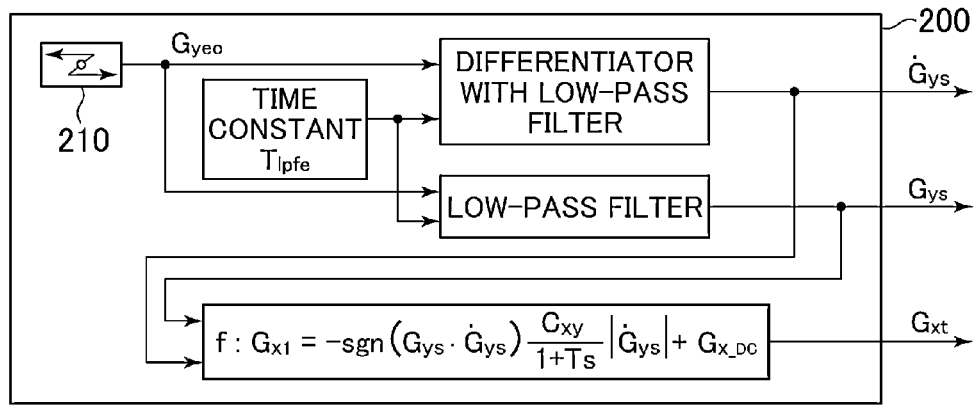
FIG. 22 is a diagram depicting vehicle lateral acceleration, jerk and G-Vectoring instruction outputs for which a combined sensor is used.

FIG. 22 illustrates a method of obtaining a lateral acceleration $G_{ys}$ and a lateral jerk $G_{y\_dot}$ for control by use of, for example, a detection element signal $G_{yeo}$ of a MEMS element 210 in the combined sensor 200. Since a noise component arising from unevenness of the road surface or the like is included, it is necessary to pass also the detection element signal through a low-pass filter (time constant $T_{lpfs}$) (this is not dynamics compensation).

In the combined sensor 200, the lateral acceleration $G_{ys}$ and the lateral jerk information $G_{y\_dot}$ for control obtained may be used to calculate a GVC instruction from the Formula 1 by an acceleration/deceleration instruction calculation unit and output an acceleration/deceleration instruction value $G_{xt}$ or calculate a moment instruction value (M+) from the Formula 21 and output a moment instruction value $M_{z+}$.

To achieve both merits in such estimation and measurement of the lateral acceleration and jerk as described above, the present working example adopts a method that both signals are used complementarily as depicted in FIG. 23.

An estimation signal (indicated by a subscript e which represents estimated) and a detection signal (indicated by a subscript s which represents sensed) are multiplied by a variable gain based on lateral slip information (lateral slip angle β, yaw rate r or the like) and then are added.

This variable gain $K_{je}$ ($K_{je}$<1) for the lateral jerk estimation signal $G_{ye}$ assumes a high value within a range where the lateral slip angle is small, but is changed so as to have a lower value as the lateral slip increases. Further, the variable gain $K_{js}$ ($K_{js}$<1) for the lateral jerk detection signal $G_{ys\_dot}$ assumes a low value within a range where the lateral slip angle is small, but is changed so as to have a higher value as the lateral slip increases.

Similarly, the variable gain $K_{ge}$ ($K_{ge}$<1) for the lateral acceleration estimation signal $G_{ye}$ assumes a high value within a range where the lateral slip angle is small, but is changed so as to have a lower value as the lateral slip increases. Further, the variable gain $K_{gs}$ ($K_{gs}$<1) for the lateral acceleration detection signal $G_{ys}$ assumes a low value within a range where the lateral slip angle is small, but is changed so as to have a higher value as the lateral slip increases.

By adopting such a configuration as described above, acceleration and jerk signals in which noise is reduced over a range from the normal region in which the lateral slip angle is small to the limit region in which the lateral slip is great and which is suitable for control can be obtained. It is to be noted that the gains of them are determined using a function for lateral slip information or a map. Or, even if select high of absolute values is performed simply in such a manner as depicted in FIGS. 15 and 18, it was confirmed successfully that practical use is anticipated sufficiently.

So far, the apparatus configuration and the method for estimating a lateral acceleration and a lateral jerk (which may be included as a logic in the combined sensor 200 in which the sensors in FIG. 19 are integrated or in the central controller 40) of the first working example of the motion controlling apparatus for a vehicle according to the present invention have been described.

Now, a system configuration including the logic according to the present invention is described with reference to FIG. 24.

Figure 24:
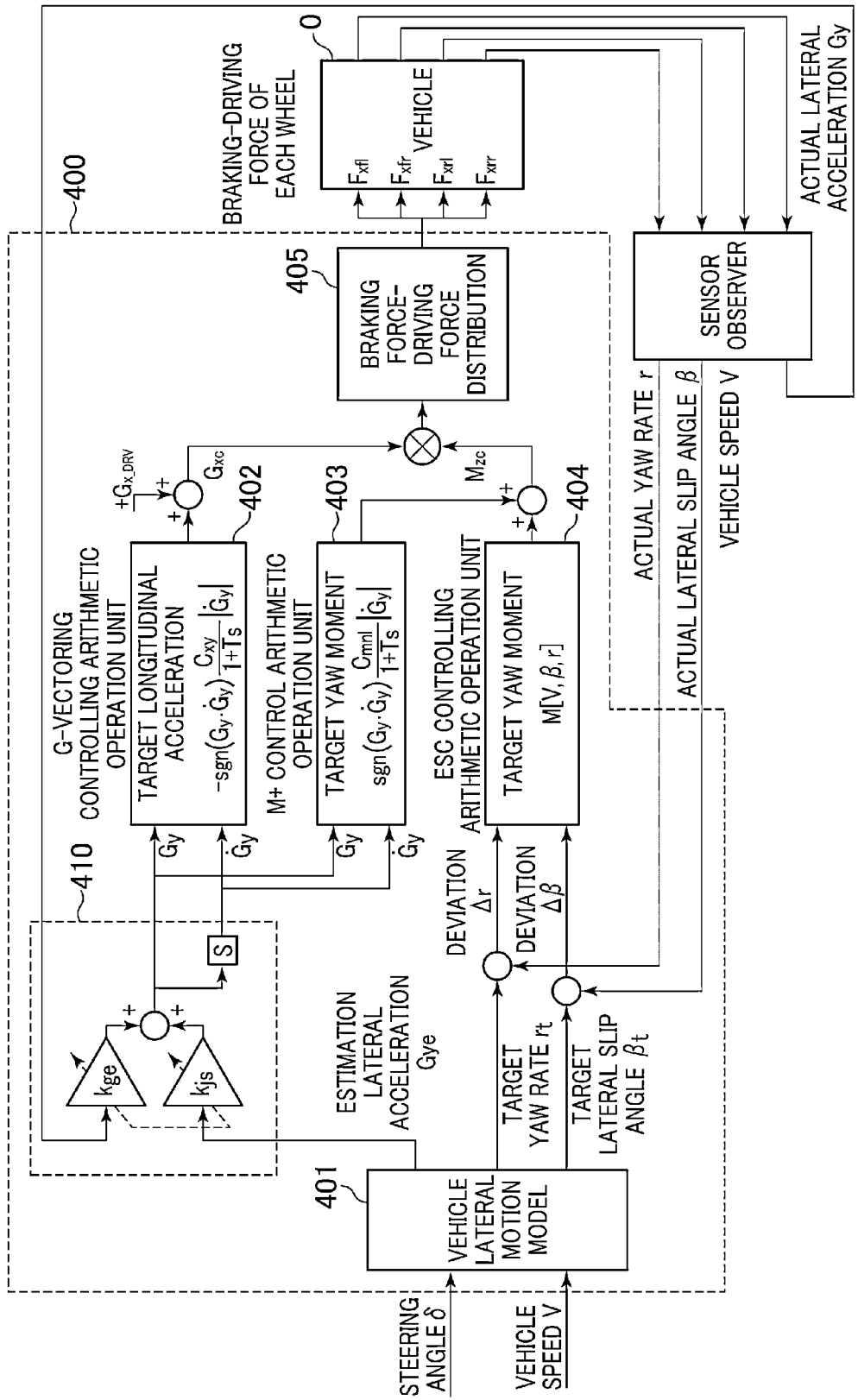
FIG. 24 is a diagram depicting a control logic configuration of the motion controlling apparatus for a vehicle according to the present invention.

FIG. 24 schematically depicts a relationship between a calculation control logic 400 of the central controller 40 serving as control means and an observer which estimates (although calculation is performed in the central controller 40) a lateral slip angle on the basis of the vehicle 0, sensors and signals from the sensors. The entire logic is roughly configured from a vehicle motion model 401, a G-vectoring control calculation unit 402, an M+ control calculation unit 403, an ESC control calculation unit 404 and a braking force/driving force distribution unit 405.

In particular, the central controller 40 serving as control means generates an acceleration/deceleration instruction and a moment instruction on the basis of a detected steering angle δ and vehicle speed V and an acceleration/deceleration instruction $G_{x\_DRV}$ of the driver. The acceleration/deceleration instruction is generated by acceleration/deceleration instruction generation means (vehicle motion model 401, G-vectoring control calculation unit 402 and an adder of a driver acceleration/deceleration instruction). In particular, the acceleration/deceleration instruction is generated as a control instruction value by adding a driver acceleration/deceleration instruction to a target longitudinal acceleration generated on the basis of the steering angle and the vehicle velocity. Further, the braking force/driving force distribution unit 405 serving as driving force/braking force distribution means determines driving forces or driving torques for the wheels and/or distribution of driving forces or braking torques.

The vehicle motion model 401 estimates, from the steering angle δ inputted from the driver steering angle sensor 33 and the vehicle velocity V, an estimation lateral acceleration ($G_{ye}$), a target yaw rate $r_t$ and a target lateral slip angle $β_t$ using the Formula 2 and the Formula 3. In the present working example, the target yaw rate $r_t$ is set so as to be equal to a yaw rate $r_δ$ determined from steering.

For the lateral acceleration and the lateral jerk to be inputted to the G-vectoring control calculation unit 402 and the M+ control calculation unit 403, the signal processing apparatus (logic) 410 which complementarily uses signals of them is adopted as depicted in FIG. 23.

The G-vectoring control calculation unit 402 determines a component associated with the vehicle lateral motion at present from within the target longitudinal acceleration instruction $G_{x\_GVC}$ in accordance with the Formula 1 using the lateral acceleration and the lateral jerk inputted thereto. Further, the G-vectoring control calculation unit 402 adds $G_{x\_DRV}$ which is an acceleration/deceleration intention of the driver to calculate a target longitudinal acceleration instruction $G_{Xc}$ and outputs the target longitudinal acceleration instruction $G_{Xc}$ to the braking force/driving force distribution unit 405. Naturally, select high may be applied to the acceleration and jerk values similarly as in FIG. 18. In other words, the target longitudinal acceleration instruction $G_{x\_GVC}$ is calculated on the basis of the estimation lateral acceleration, which is calculated from the steering angle and the vehicle velocity, and the lateral jerk, which is calculated from the estimated lateral acceleration.

Similarly, the M+ control calculation unit 403 determines a target moment in accordance with the Formula 21 using the lateral acceleration and the lateral jerk. In other words, the target moment instruction $M_{z+}$ is calculated on the basis of the estimation lateral acceleration calculated from the steering angle and the vehicle velocity, and the lateral jerk calculated from the estimated lateral acceleration.

Then, the ESC control calculation unit 404 calculates a target moment $M_{z\_ESC}$ on the basis of the deviations $\Delta r$ and $\Delta \beta$ between the target yaw rate $r_t$ ($r_\delta$) and target lateral slip angle $\beta_t$ and the actual yaw rate and actual (estimated) lateral slip angle, and adds the target moment $M_{z\_ESC}$ to the target moment instruction $M_{z+}$ calculated as above and outputs a resulting instruction to the braking force/driving force distribution unit 405. Naturally, select high may be applied to the two moment instruction values similarly as in FIG. 18. The target moment $M_{z\_ESC}$ is calculated on the basis of the steering angle, the vehicle velocity and the yaw rate and the lateral slip angle of the vehicle.

Figure 25:
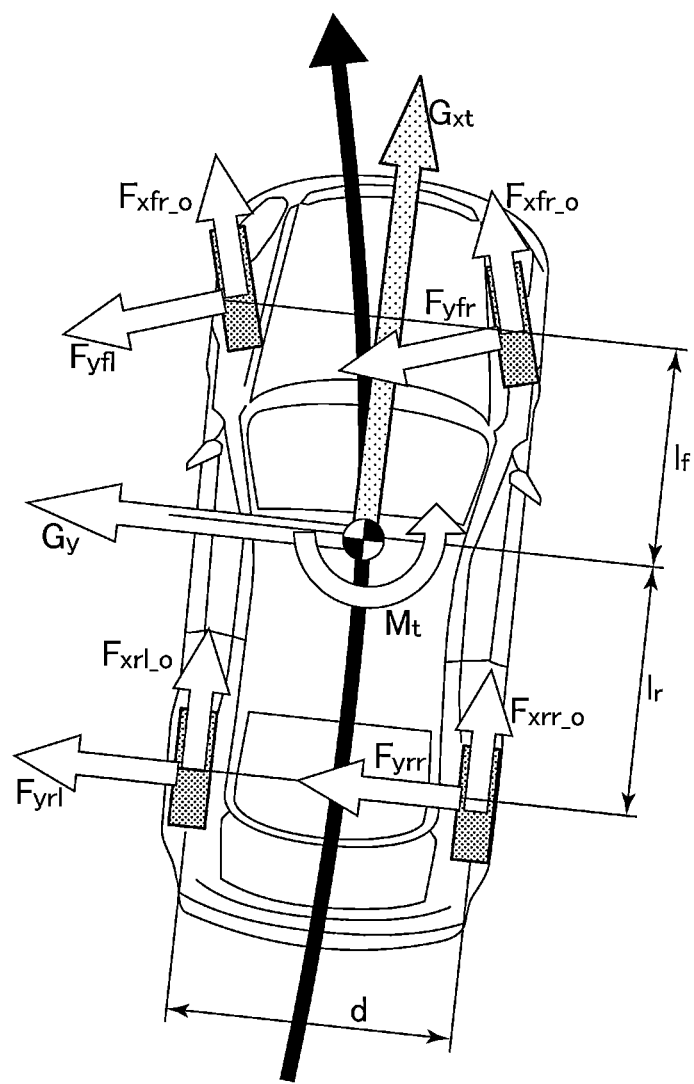
FIG. 25 is a diagram depicting a force and an acceleration applied to a vehicle and a yawing motion.

The braking force/driving force distribution unit 405 is configured such that it determines initial basic braking and driving forces ($F_{xfl\_o}$, $F_{xfr\_o}$, $F_{xrl\_o}$, and $F_{xrr\_o}$) for the four wheels of the vehicle 0 as depicted in FIG. 25 on the basis of the target longitudinal acceleration instruction $G_{Xc}$ which is an acceleration/deceleration instruction and the target yaw moment $M_{zc}$. Naturally, the braking or driving forces are distributed so as to allow decoupling of the yaw moment control and the acceleration/deceleration control.

Now, a vehicle motion when diagonal distribution control of the present invention is applied is described assuming particular traveling.

Figure 26:
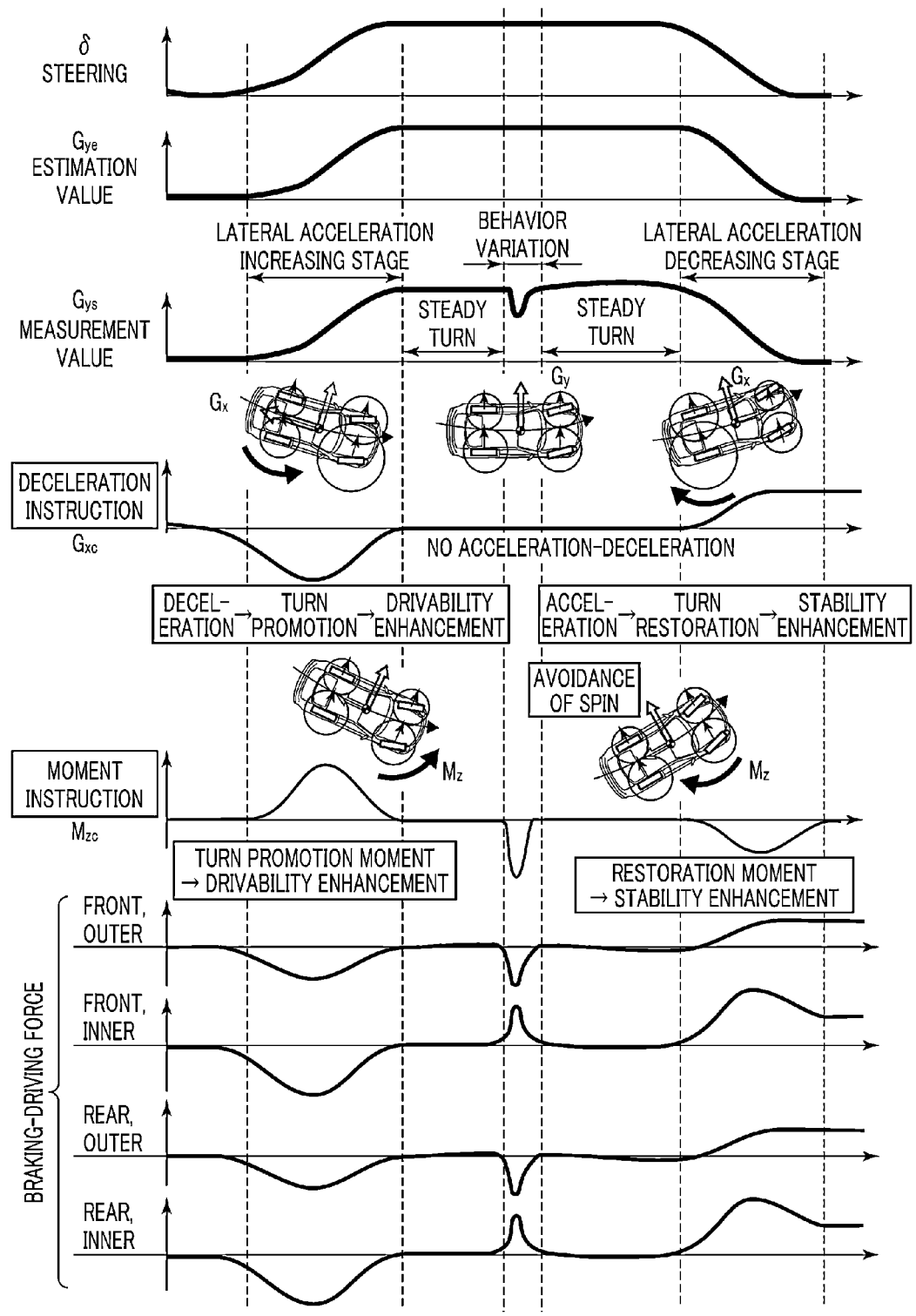
FIG. 26 is a diagram depicting braking and driving force distribution in three mode operation states of the present invention.

A hypothetical scene of FIG. 26 is similar to that of FIG. 18 (FIG. 1), and a situation that, at a point 4 in a steady turning section C from among general traveling scenes of approaching and leaving a corner including a straight road A, a transient section B, a steady turning section C, another transient section D and a straight section E, a behavior variation occurs. At a lower stage, braking/driving forces of the front outer, front inner, rear outer and rear inner wheels are depicted.

First, at a time of deceleration by the driver before the curve, braking forces by the brakes for the four wheels having an equal pressure acts (there is no difference between the turning inner and outer wheels). At a stage at which a lateral acceleration increases in response to an input of a steering angle, the braking forces for the front and rear wheels on the turning inner side has a high value so that a moment for promoting the turn is generated. Further, if the lateral acceleration increasing stage passes and steady turning is entered, then the braking/driving forces reduce to zero (also the lateral jerks are zero).

Here, if a behavior variation of a spinning tendency occurs, then a restoration moment in the opposite direction to the turning direction is required to prevent the spinning. To this end, braking forces are applied to the front and rear wheels on the turning outer side so that a clockwise moment is obtained. Further, since the instruction for acceleration/deceleration is zero, driving forces are applied to the front and rear wheels on the turning inner side. Consequently, the braking forces and the driving forces in the forward/backward direction are balanced, and the acceleration/deceleration of zero can be implemented. Further, since also the driving forces become a clockwise moment, a greater stabilization moment is obtained and improvement of the spinning preventing performance is achieved (at this time, a configuration for returning regenerative energy obtained by braking to the driving side may be adopted).

Further, when the car is leaving a curve, driving forces are distributed so as to be applied to the front and rear wheels on the turning outer side to provide a moment on the restoration side so that the straightly advancing state may be restored at an early stage. Naturally, after the straightly advancing state is entered fully, the driving forces are distributed so that a left/right difference may not occur.

As described above, the central controller 40 of such a vehicle 0 in which four-wheel independent braking/driving control is possible as depicted in FIG. 20 implements Hybrid+ Enhanced control (braking/driving control) of acceleration/deceleration control by a G-Vectoring control instruction (and a driver control instruction) based on a lateral jerk, yaw moment control by a moment plus (M+) control instruction based on the lateral jerk and yaw moment control by an ESC control instruction based on lateral slip information. Consequently, a behavior variation suppression effect which does not involve acceleration/deceleration can be obtained together with improvement in drivability and stability.

Further, since the vehicle includes motors (left rear wheel motor 1, right rear wheel motor 2, left front wheel motor 121 and right front wheel motor 122) for generating braking forces or braking torques as in the present working example, the vehicle may be configured such that it incorporates regeneration means (not depicted) for regenerating electric power generated when braking forces or braking torques is generated by the electric motors so that energy involved in the motion control can be recovered.

Also where the Hybrid+ control is considered only from brake control which does not involve driving, by incorporating all of a G-Vectoring control instruction calculation unit, a moment plus (M+) control instruction calculation unit and an ESC control instruction calculation unit into one controller, for example, into an ESC of premium specifications similarly to the central controller 40 described hereinabove, similar effects can be achieved although some deceleration is generated. However, this comes to utilize a so-called brake LSD effect, Torque-Vectoring effect such as to apply braking or apply driving forces to one side of the driving wheels having a differential gear.

The control effect of the working example which is an ideal mode are described above. In the following, that another effect which makes possible the Hybrid+ control to which moment plus control of the present invention is added, namely, an effect that a superior control effect is obtained even in a state in which the hardware configuration is restricted, is achieved is demonstrated using results of experiments.

WORKING EXAMPLE 2

Figure 27:
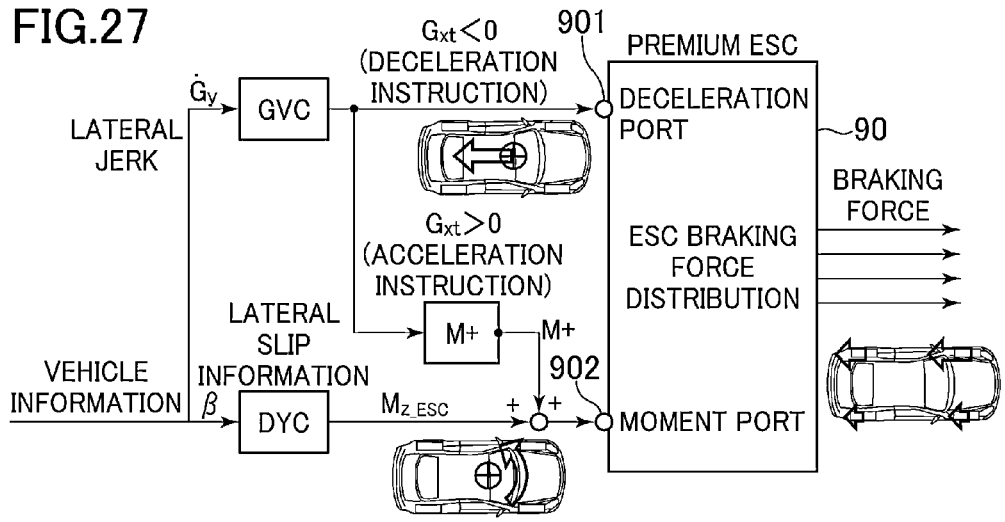
FIG. 27 is a diagram depicting a control configuration of a second working example of the motion controlling apparatus for a vehicle according to the present invention.
Figure 28:
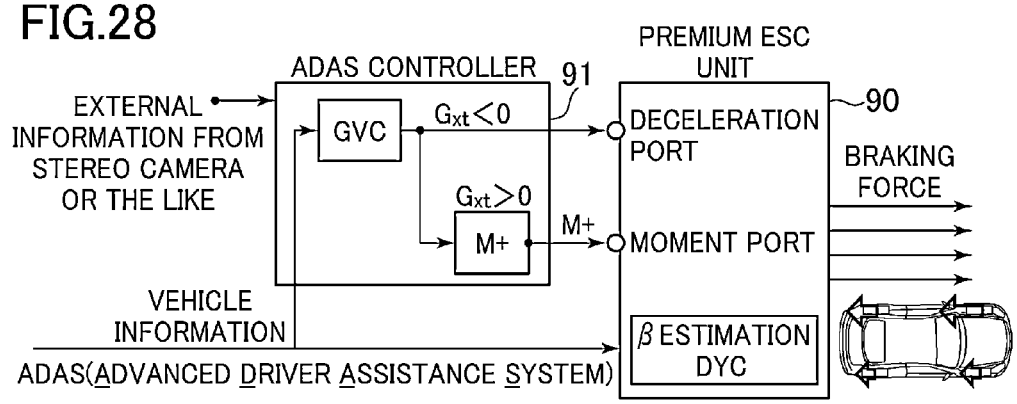
FIG. 28 is a diagram depicting a controller configuration of the second working example of the motion controlling apparatus for a vehicle according to the present invention.

FIG. 27 depicts a control configuration of a second embodiment of the present invention. Basically, the second embodiment is configured such that a deceleration instruction by the GVC and a moment instruction by the M+ are applied to a deceleration port 901 and a moment port 902 provided in a premium ESC 90. An original movement of the ESC is then subjected to moment control using lateral slip information. Yet actually, as depicted in FIG. 28, the ESC control logic itself is incorporated as conventional control in the main body of the premium ESC together with an estimation logic for the lateral slip angle β and so forth. Information is then sent to the deceleration port 901 and the moment port 902 from an external controller such as an ADAS controller 91 through a CAN connection.

In the ADAS controller 91, a control changeover function is incorporated which is ready for an ITS such that, for example, when an obstacle is found on the basis of various kinds of external information obtained from a stereo camera or navigation information or through communication with the outside, the gain of the GVC or the M+ is changed to a rather high value. By virtue of the control changeover function, in a normal state, it is possible to operate the control with a setting in which the uncomfortable feeling in a normal region is reduced, but when an obstacle exists, it is possible to operate the control with a control setting in which the emergency avoidance performance is improved, and the safety can be improved significantly. Further, the second embodiment is configured such that the acceleration/deceleration instruction is decreased to zero when external information including one of obstacle information, preceding vehicle information and succeeding vehicle information is obtained so as to avoid a collision, a rear-end collision and so forth.

It is needless to say that an acceleration operation instruction and a brake operation instruction from the driver are inputted to the ADAS controller 901 (though not depicted). The acceleration instruction of the GVC is adjusted to zero when the brake operation instruction from the driver is inputted whereas the deceleration instruction of the GVC is adjusted to zero when the acceleration operation instruction from the driver is inputted. Thus, a vehicle which complies with an intention of the driver is implemented.

Since the motion control logic is incorporated in the ADAS controller to which external information is collectively transmitted, such meticulous control as described above can be implemented readily.

The superiority of the present invention is demonstrated below using a result obtained when a test was performed on a compacted snow road using a test vehicle which embodied the second working example of the present invention.

Figure 29:
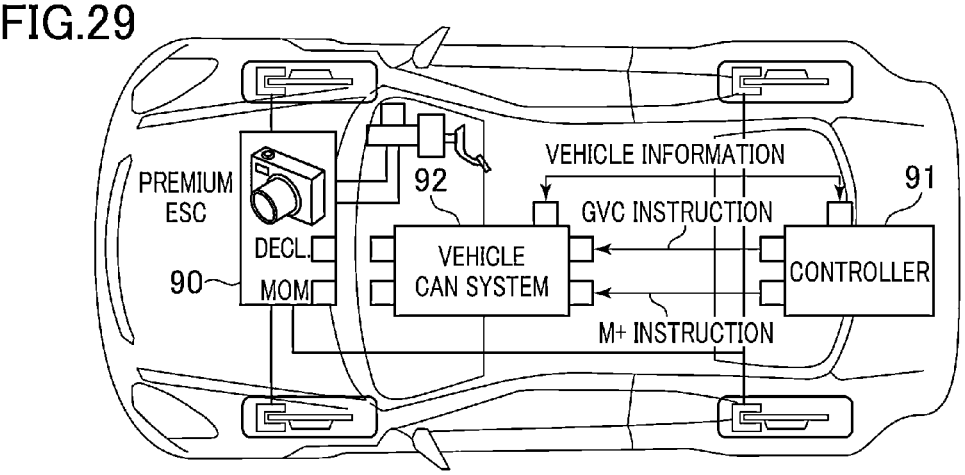
FIG. 29 is a diagram depicting a vehicle configuration of the second working example of the motion controlling apparatus for a vehicle according to the present invention.
Figure 32:
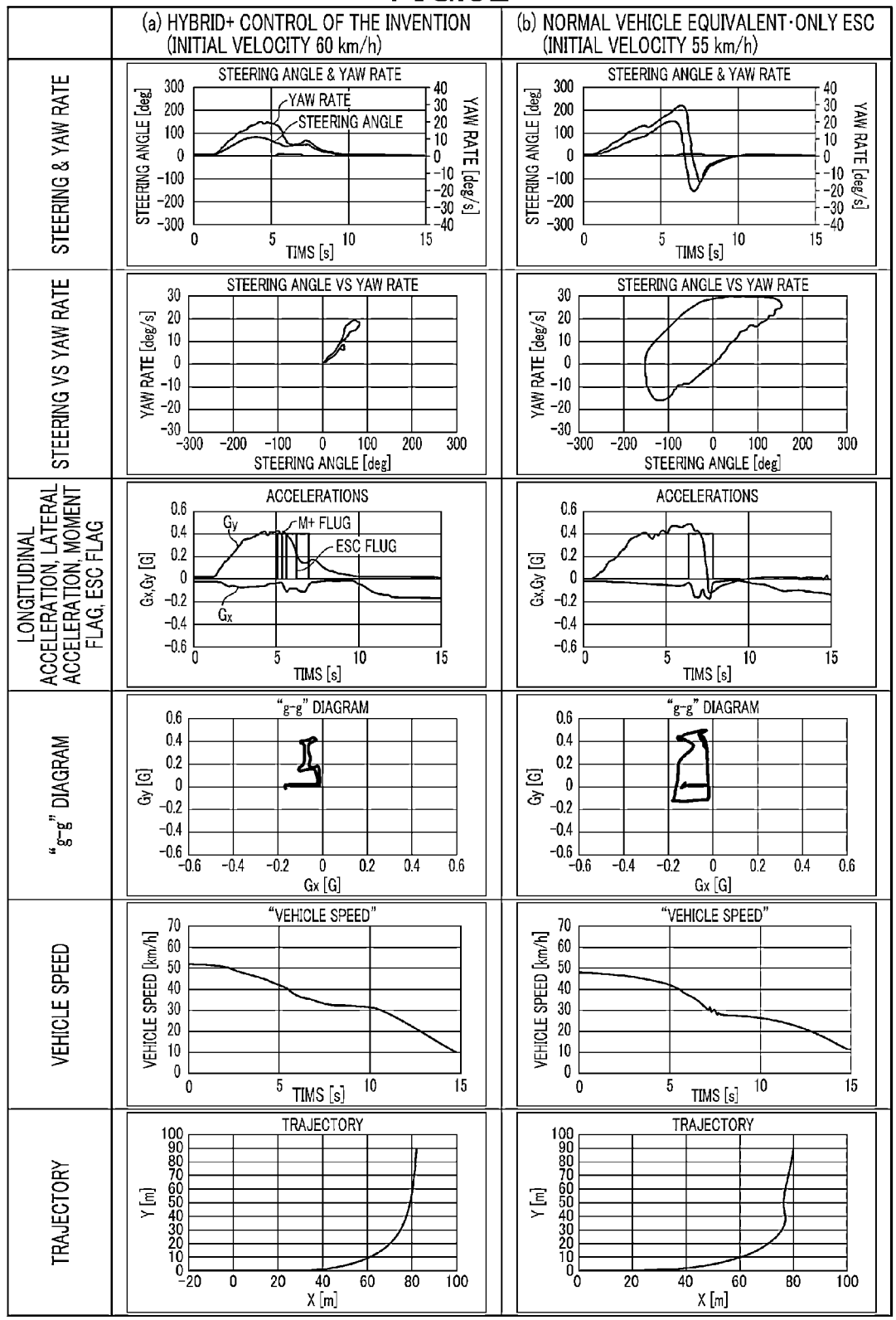
FIG. 32 is a table indicating results of an L turn test for a vehicle "equivalent to vehicle with Hybrid+ control" of the present invention and another vehicle "equivalent to vehicle with normal ESC."
Figure 33:
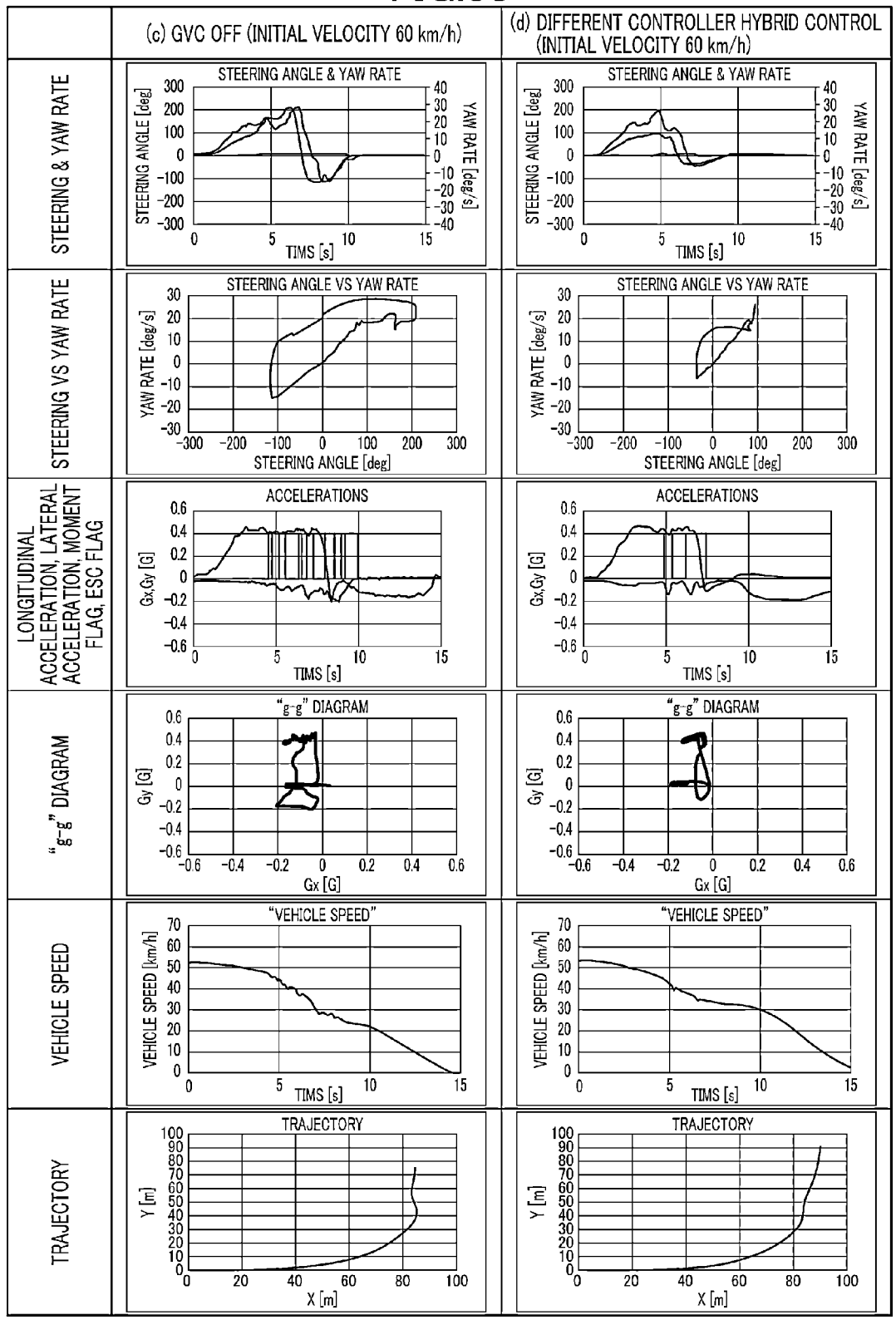
FIG. 33 is a table indicating results of an L turn test for GVC off and a vehicle "equivalent to vehicle with different controller hybrid control."
Figure 34:
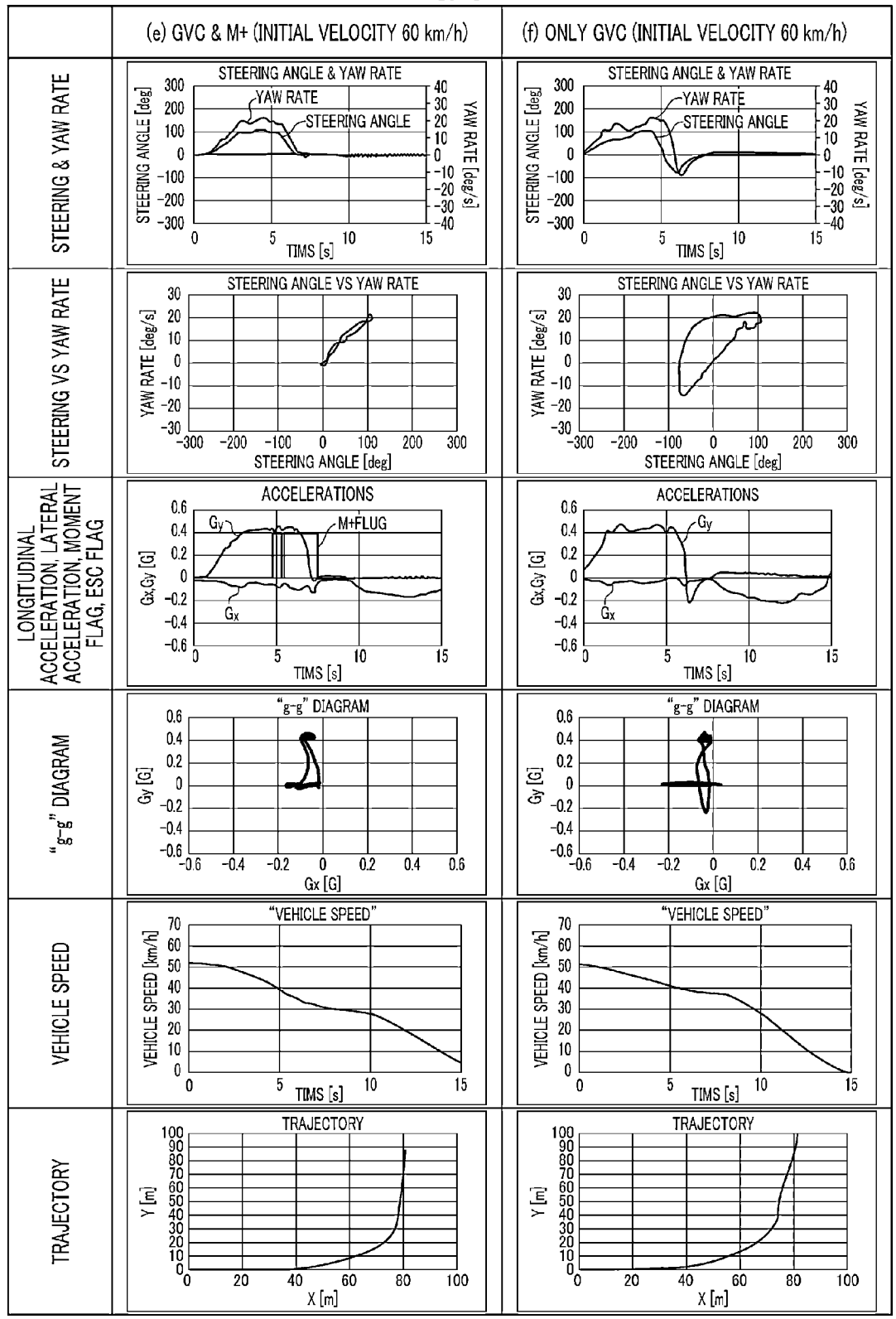
FIG. 34 is a table indicating results of an L turn test for a GVC & M+ vehicle and a vehicle only with GVC.
Figure 35:
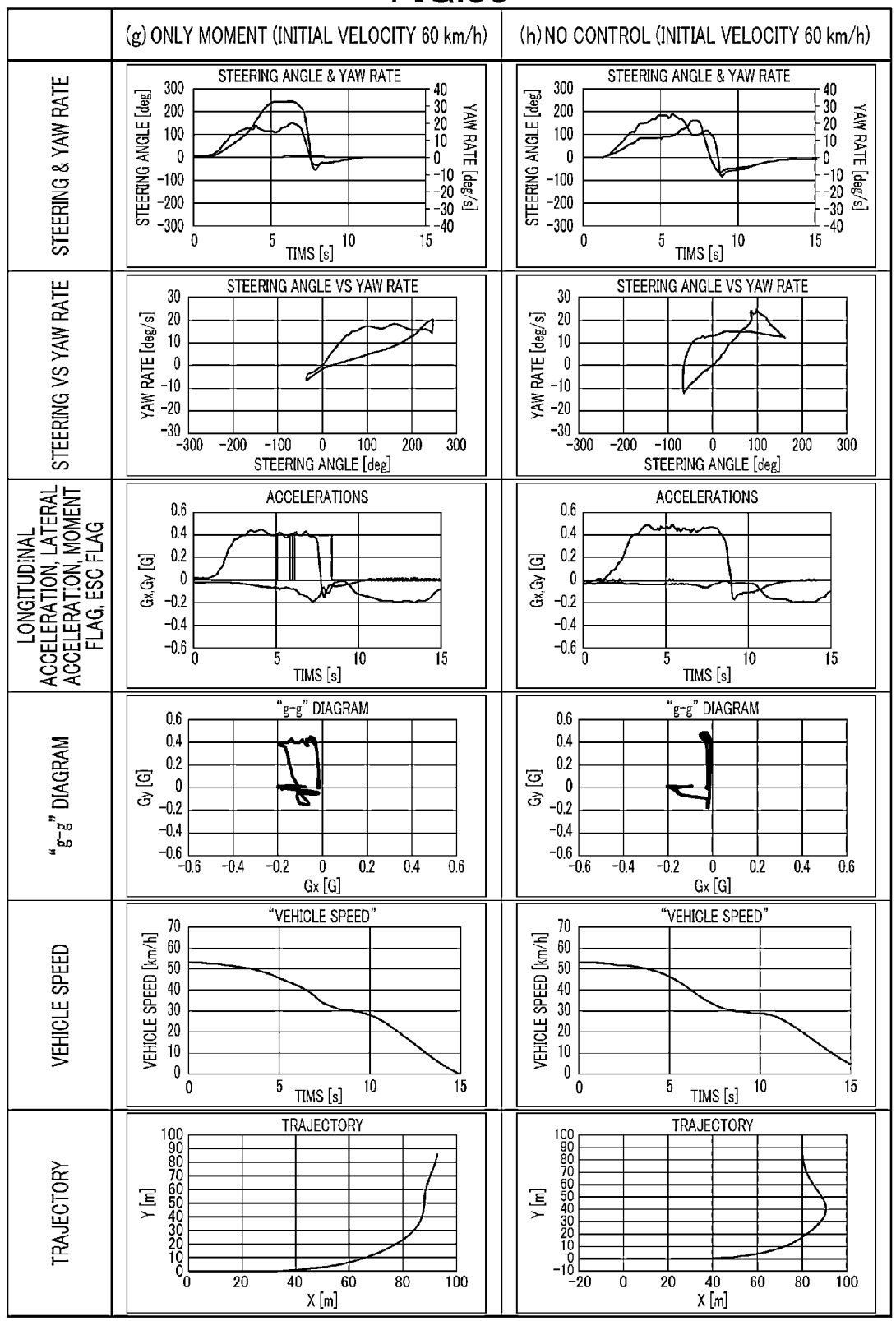
FIG. 35 is a table indicating result of an L turn test for a vehicle only with M+ and a vehicle without control.

FIG. 29 depicts an outline of the test vehicle which embodied the configuration depicted in FIGS. 27 and 28. The vehicle is an FR type five-speed AT vehicle having an exhaust amount of 2.5 liters. As the ESC unit, a model of premium specifications is incorporated. The ESC unit is configured such that a general-purpose controller compatible with the ADAS controller is used to write a GVC instruction value and an M+ instruction value into ports for a deceleration instruction value and a moment instruction value of the Vehicle CAN system, and hardware is not remodeled. In comparison with closed communication in the ESC unit, the CAN communication has a disadvantage that the communication speed is very low. Conversely, if an advantage in controlling a vehicle movement is obtained with such a configuration as just described, then it can be demonstrated that a control effect is obtained with any of the configurations depicted in FIG. 5 (in whichever one of the controller connected to each other by the CAN the logics of the GVC and the M+ are incorporated). Consequently, high-quality motion control according to the present invention using the plurality of embodiments can be implemented and the concerned technology and apparatus can be provided to a greater number of drivers.

Although state variables such as a wheel speed or lateral slip angle information and control amounts such as a moment or a deceleration in the ESC cannot be monitored, it was able to measure a flag indicating that the ESC (VDC) is operating. The software and controller developed with such a configuration as described above do not require remodeling of hardware and software and also expansion thereof to a vehicle having a different actuator can be performed readily. Consequently, they have an advantage that development thereof at a low cost is possible.

Test Contents

Such following three tests as depicted in FIG. 30 were performed in order to quantitatively evaluate the second working example of the present invention.

L Turn Test

An L turn test is such a test mode showing control interfering and its ending principally at the time of ESC development, the test mode further inducing slow spinning due to loose steering. The L turn test can be regarded as a standard menu which has been performed irrespective of a dry road or a snow road at an initial stage of the development of the GVC. In the case of a compacted snow road, such a behavior occurs that, even if steering is performed smoothly and slowly, the rear side of the vehicles starts shaking on occasions when they enter the road at a speed around 60 km/h. Evaluation of line traceability can be performed by measuring a locus using the GPS together with measurement of the steering angle input and various condition amounts. Principally checking driver steering for performing simple right angle cornering and a response and a phase of the yaw rate in response to the driver steering evaluates the drivability and so forth of the vehicle and control by the driver. At the present time, an entering permitting speed and a correction steering amount at the time of an L turn were evaluated.

Lane Change Test

A single lane change, being high frequency steering which assumes emergency avoidance, is for evaluating an operation tracking performance (traceability) and behavior stability (convergence property). Although the interference timing and amount should be tuned on the basis of evaluation of a test driver who exhibits a less dispersion in operation, it was determined at this time to simply evaluate only whether a lane change was successful. Further, for the convenience of the space, description is given only of limited control specifications (where the DVC, ESC and W+ are incorporated [Hybrid+] and only the ESC [equivalent to a normal vehicle] is incorporated).

Handling Course Test

Comprehensive evaluation of a feeling and so forth which cannot be digitized is performed. At this time, the vehicle did not travel at its maximum speed with possible risks; it was intended to drive the vehicle to travel in conformity with vehicle characteristics implemented by control while a sufficient margin is taken.

Contents of Controls Placed in Tests

Since the ESC, GVC and M+ controls were involved at this time, control evaluation of ON/OFF of them, namely, of 2^3=8 controls (FIG. 31), was performed. Although a vehicle which does not incorporate the ESC therein is not at all productized actually (legally as well), since the ESC may possibly be turned OFF within responsibility of the driver, also a test for a combination with ESC OFF was conducted. Further, in (d) among the controls, the GVC is ON, the ESC is ON and the M+ is OFF. In the case of this configuration, a GVC instruction is transmitted as a CAN signal from a different controller to the ESC, and seamless control is not constructed because the intervention threshold value and so forth of the SC are not changed. Accordingly, this is described as (d) Different controller hybrid control.

The most significant comparison is between the case (a) where all controls are involved (Hybrid+ control of the invention) and the case (b) where a vehicle "equivalent to vehicle with normal ESC" is employed. The case (a) is an image of the best mode which can be implemented by the second working example of the present invention.

Actual Vehicle Test Result

L Turn Test Result

L turn test results of the cases (a) to (h) of FIG. 31 are depicted in FIGS. 32 to 35. Evaluation points of them are described.

(1) Time Series Data of Steering Angle and Yaw Rate

It can be evaluated in what manner the yaw rate varies together with a steering angle variation. For example, within a range where the steering angle is small, the yaw rate has a substantially linear response relationship. However, as the steering angle increases, separation from this relationship appears. Further, when the steering angle exceeds almost 100 degrees, also the lateral slip angle of the front wheels exceeds 6 degrees from the relationship of the gear ratio, and therefore, a nonlinear characteristic comes to appear. The drivability can be comprehended from the relationship between the steering angle variation and the yaw rate variation.

(2) Lissajous Waveform Initial Speed of Steering Angle and Yaw Rate

Although close to the foregoing, a nonlinearity of the yaw rate with respect to the steering angle can be comprehended. Further, the steering range during an L turn becomes obvious, and it is targeted that the steering range falls within a range where it is in the positive. In order to secure the drivability, it is desirable that an oblique single line is indicated in the first quadrant.

(3) Longitudinal and Lateral Accelerations and ESC, M+ Flag

The superiority in course traceability can be compared in a situation where the lateral acceleration increases. Naturally, the traceability is lower where the lateral acceleration rises more rapidly. Unless the lateral acceleration rises, the driver will have to do nothing but continue to increase the steering angle. It is recognized that, when the GVC is operative, a deceleration is generated in association with the lateral motion. Further, from flags of the individual controls, it can be recognized whether or not the control is operating when the lateral acceleration drops (the lateral jerk is in the negative).

(4) "g-g" Diagram

A link between the longitudinal and lateral accelerations can be recognized. Preferably, the diagram exhibits a smooth transition in a curved state.

(5) Vehicle Velocity Transition

It can be recognized at which timing the velocity is reduced. Further, an initial velocity at a time of entrance into an L turn can be recognized.

(6) Vehicle Route

Naturally, it is better that the course be traced at a right angle without a swing.

In the following, evaluation of the respective cases is described successively in comparison with the others. It is to be noted that, in an event where only the ESC is involved, the test result when the entering speed was 55 km/h while the vehicle departed from the course was adopted; the other test results were obtained at the entering speed of 60 km/h.

(a) Hybrid+ Control (ESC ON, GVC ON, M+ ON)

Both the steering angle and the yaw rate remain within small ranges. The present data was selected from that of a case in which spinning was about to occur at a late stage of turning (in order to check operation of the moment control). The steering angle vs. yaw rate remains within the first quadrant, no correction steering in the negative direction is found, and the linearity is maintained. Even if a sudden increase of the yaw rate occurs, since this is stopped accurately by the M+ control and the ESC, counter steering by the driver is little performed. The trajectory indicates that the vehicle travels at a clean right angle along the L turn.

(b) Vehicle "Equivalent to Vehicle with Normal ESC" (ESC ON, GVC OFF, M+ OFF)

A so-called slow spin state is exhibited. Since the yaw rate does not increase even if the steering angle is increased, in order for the vehicle to travel along the course, the steering angle is increased steadily. The yaw rate is soon placed into a state in which it does not stop and correction steering is performed hastily toward the negative direction. The ESC does not operate until the correction steering comes to the negative direction, and as a result, the vehicle exhibits a motion causing swinging to right and left. The linearity of the yaw response to the steering angle gives rise to a great phase difference particularly to the return side, resulting in a complicated characteristic. It is supposed that, at a point of time at which a large steering angle (proximate to 150 degrees) is required for the first time, a delay of the correction steering is caused.

(c) GVC Off (ESC ON, GVC OFF, M+ ON)

Since the GVC does not operate, the yaw rate does not follow up the steering angle similarly as in the case of (b) a vehicle "equivalent to vehicle with normal ESC", and therefore, the steering angle gradually increases, and thereafter, correction steering is applied toward the opposite direction. By virtue of the M+ control, the negative correction steering amount is smaller than that in the case of (b) (−150 degrees to −110 degrees).

(d) Different Controller Hybrid+ Control (ESC ON, GVC ON, M+ OFF)

Although the steering angle at an initial stage of turning was successfully decreased (smaller than 100 degrees) by the GVC, the oversteer in the latter half was not successfully stopped only by the ESC, and as a result, reversal of the yaw rate occurred. Since the steering angle is small, the fluctuation is less than that in the cases of (b) and (c). In other words, it is indicated that even the configuration for transmitting an instruction of the GVC from a different controller in the form of a CAN signal whose communication speed is low can exhibit an effect of the GVC definitely and has more significance than the vehicle which involves only the ESC.

(e) GVC & M+ (ESC OFF, GVC ON, M+ ON)

The steering angle at an initial stage of turning is reduced by the GVC, the rise of the yaw rate is good, and they are stabilized by the moment also in the latter half. The Lissajous waveform of the steering angle vs. yaw rate is almost linear and passes the same place at the go and return. Thus, it is hard to feel the low friction road in the driving. The g-g" diagram exhibits a movement of a curved line, and a preferable feeling was implemented successfully. This signifies that, within a range until the ESC operates, high-quality control can be anticipated, and it can be recognized that an intended control performance is implemented successfully.

(f) Only GVC (ESC OFF, GVC ON, M+ OFF)

Although there is no problem at an initial stage of turning, the rear side of the vehicle still begins to swing in the latter half, and as a result, correction steering occurs toward the opposite direction. The steering speed is rather low. Since the deceleration by the GVC does not appear by a great amount, the vehicle velocity is higher than that in the case of (e).

(g) Only Moment (ESC OFF, GVC OFF, M+ ON)

Since the steering is not effective as expected, the steering angle becomes excessively great and reverses in the latter half.

(h) No Control (ESC OFF, GVC OFF, M+ OFF)

Since no control is involved, driving is performed carefully, and the increase of the steering angle is relatively small. A reversal in the latter half occurs ordinarily. Since the moment control for restoration is not involved, correction by a little greater amount than that in the case of (g) is performed.

From the results described above, it was confirmed that the concept that the understeer is suppressed to decrease the steering angle by the GVC and thereafter the oversteer is reduced by the M+. By virtue of combination of the ESC and the present control (GVC & M+), it was possible to enhance the entering angle by 10 percent, increase the safety margin and eliminate correction steering in the negative direction thereby to improve the drivability and the safety, in comparison with the ordinary ESC.

Lane Change Test Results

Figure 36:
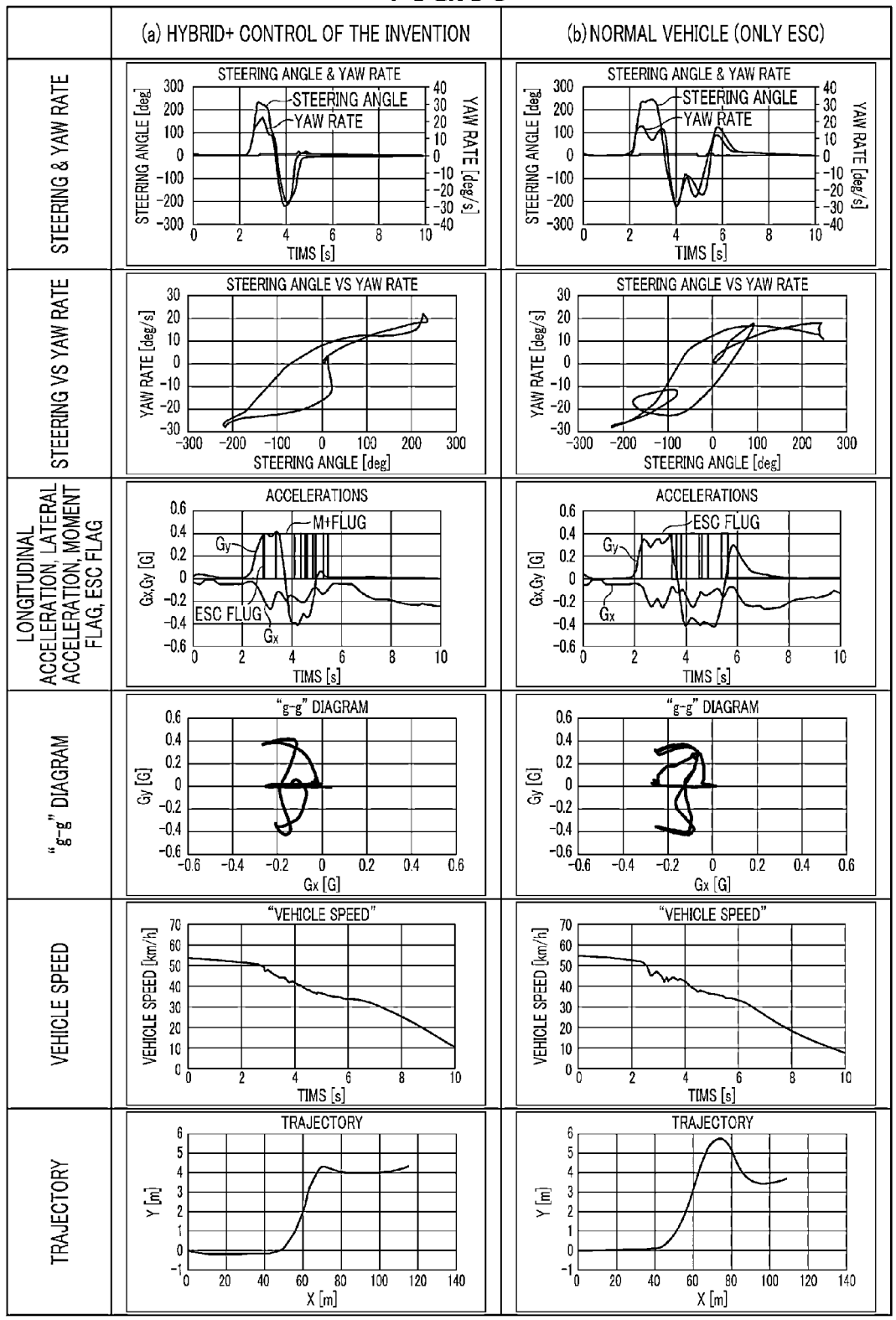
FIG. 36 is a table indicating results of lane change test for a vehicle "equivalent to vehicle with Hybrid+ control" of the present invention and another vehicle "equivalent to vehicle with normal ESC."

The lane change test results indicate reflection of the motion performance described in the foregoing description of the L turn, and therefore, those only of the Hybrid+ control (ESC ON, GVC ON, M+ ON) and (b) A vehicle "equivalent to vehicle with normal ESC" is presented (FIG. 36). The initial velocity is 60 km/h as read on a meter.

(a) Hybrid+ Control (ESC ON, GVC ON, M+ ON)

The vehicle can change lanes almost without any problem although, at the time of secondary steering back, the rear side exhibits a behavior to the reverse side a little.

(b) Vehicle "Equivalent to Vehicle with Normal ESC" (ESC ON, GVC OFF, M+ OFF)

The lateral movement performance is poorer than that of the case of (a). It is necessary to keep a large steering angle for a long period of time. Within this period, the yaw rate is vibratory (in the proximity of a natural frequency of the vehicle). Therefore, on the secondary side, also the correction steering has a similar frequency, and a DIS (Driver Induced Oscillation) is exhibited. Since a lateral movement is possible in (a), the vehicle is steered back immediately. The vehicle results in success in lane change without natural vibration of the vehicle.

Handling Road Traveling Test Results

Figure 37:
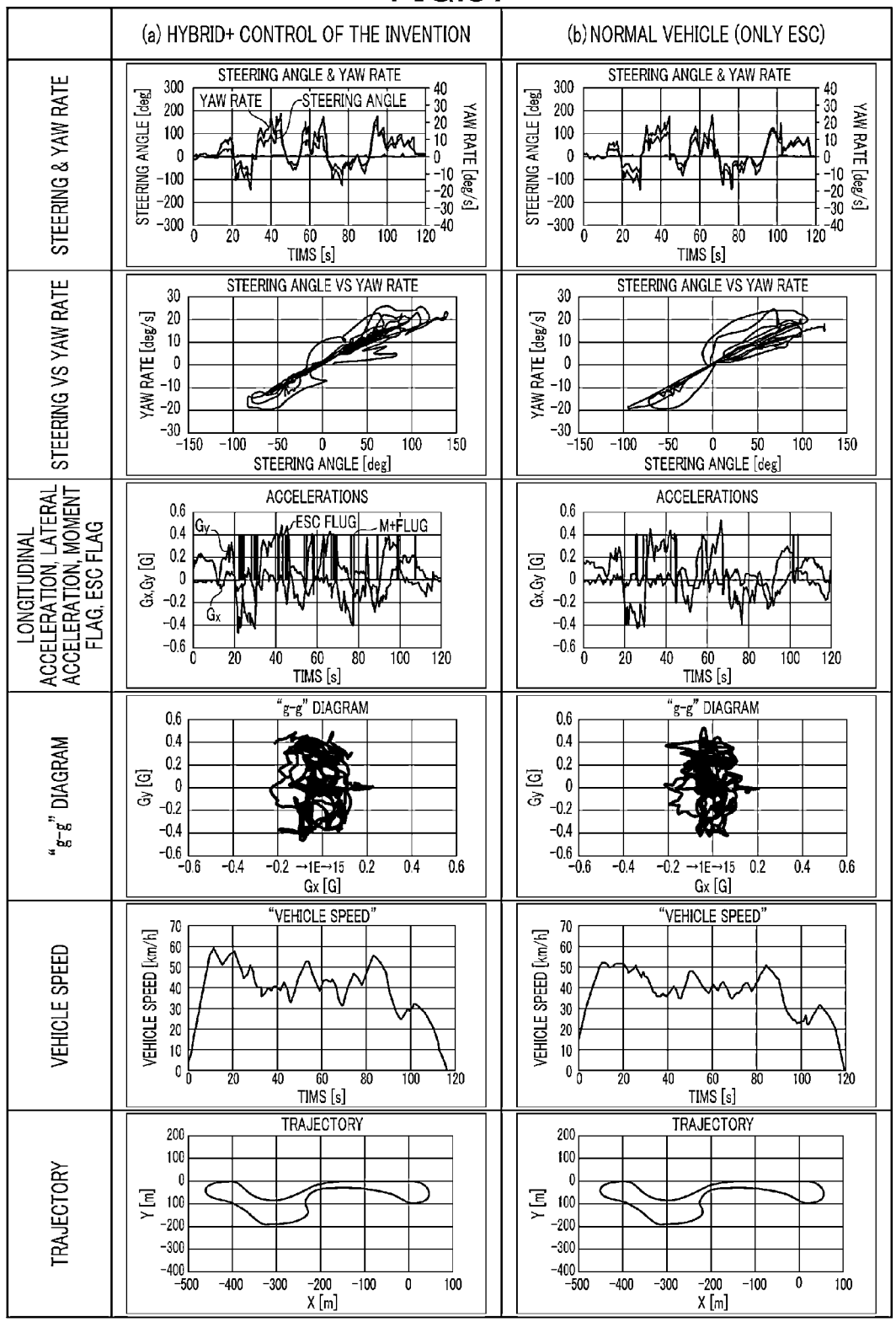
FIG. 37 is a table indicating results of a handling road traveling test for a vehicle "equivalent to vehicle with Hybrid+ control and another vehicle "equivalent to vehicle with normal ESC."

FIG. 37 depicts data when the vehicle traveled on a handling road in regard to (a) Hybrid+ control (ESC ON, GVC ON, M+ ON) and (b) a vehicle "equivalent to vehicle with normal ESC" (ESC ON, GVC OFF, M+ OFF). In both cases, traveling suitable for the vehicle characteristic implemented by control was intended with a sufficient margin. As a result, as seen from the vehicle velocities, (a) shows more disciplined driving in that the average vehicle velocity was higher by more than 5 km/h and the velocity difference was greater. In (a), although the velocity was higher, the ESC operated only at two locations: around 45 seconds and 98 seconds. Especially around 98 seconds, the vehicle was at a frozen downlink reverse bank corner, and the result is that the ESC little operated. If the "g-g" diagram is viewed, then it can be recognized that longitudinal and lateral accelerations were successfully generated evenly over a wide range in comparison with (b).

Although the evaluation was performed by a plurality of drivers (three drivers), the specifications of (a) were superior in feeling to those of (b). It is considered that this is because, with the specifications of (b), the steering is less liable to work at an entrance of a corner and it is necessary to increase the steering angle cautiously. Once the steering angle starts being larger, the ESC causes abrupt deceleration. Although the traveling was performed with other specifications of (h) No control, (d) only Moment is OFF (different controller hybrid control) and (e) GVC & M+, which indicated a good feeling in the L turn, the test results of them are omitted due to the limitations of the space.

Figure 38:
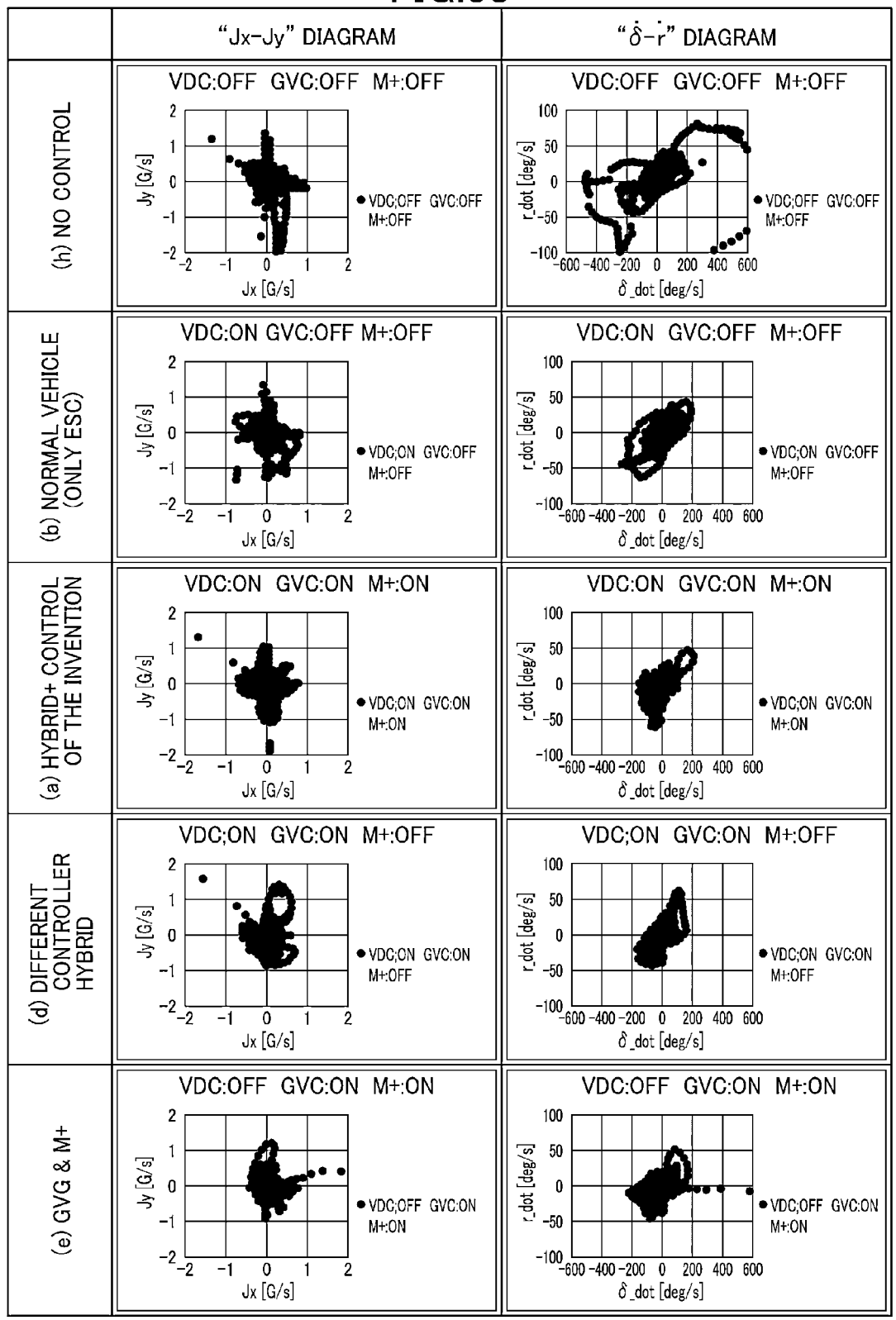
FIG. 38 is a table indicating results of a handling road test (steering stability/feeling evaluation).

To visualize the feelings of the control specifications, such a "Jx-Jy" diagram (longitudinal jerk vs. lateral jerk) and a newly devised "$\delta_{\_dot}$-$r_{\_dot}$" (steering speed vs. yaw angle speed) diagram as depicted in FIG. 38 were drawn.

It is considered that a distribution diagram of a jerk demonstrates the degree of linkage of the longitudinal motion and the lateral motion. A situation of comfortable riding refers to one where condition amounts gather in the proximity of the origin. Since (a) exhibits a higher average speed than (b), although the comparison conditions are not good, the degree of concentration to the origin is higher than that of the normal vehicle of (b). Moreover, (e) GVC & M+ which exhibited a good feeling is higher in degree of concentration to the origin than (b). This is because, within a range in front of the limit at which the ESC is not operated, similar control to that in (a) can be expected.

Further, in (d) OFF Moment (different controller hybrid control), although the condition amounts are concentrated to the origin to some degree in comparison with (b), a trajectory (traced by a plural number of times) like a circle is found in the first quadrant. This signifies that there is a portion at which a lateral motion and a longitudinal motion occur abruptly (while they are linked with each other). An evaluation of the M+ (moment plus) control invented newly at this time will now be checked on the "$\delta_{\_dot}$-$r_{\_dot}$" diagram. It is considered that, also on the diagram, where the condition amounts are spaced far from the origin and exist particularly in the second quadrant or the fourth quadrant, the vehicle control is difficult. It is considered that, if ideally the condition amounts are concentrated on a steadily increasing line (whose inclination is represented by K) passing the origin or in the proximity of the origin, then the vehicle can be driven easily. This is because it is considered that K is an instant yaw rate gain (dr/dδ) with respect to a unit steering amount during a motion (Formula 31).

$$K = \frac{\frac{dr}{dt}}{\frac{d\delta}{dt}} \approx \frac{dr}{d\delta} \qquad \text{[Formula 31]}$$

Where this is fixed in the individual motion states, the vehicle can be handled easily. It can be seen that, in (d) where Moment if OFF (different controller hybrid control), the inclination K is greater than in (a) and (e). In particular, it can be seen that the inclination K has a rather peaky characteristic with respect the steering. It is considered that this is because the control for compensating for a decrease of the restoration moment is not used and this is a result which demonstrates the effectiveness of the M+ control.

In the above manners, by virtue of the driving stability-feeling evaluation using the two different diagrams where handling road test results were employed, effects of the individual controls were quantitatively evaluated successfully from a dynamical point of view. This evaluation made it possible to confirm the effectiveness of the GVC and M+ control. Those controls can be implemented by sending an instruction from a controller equivalent to the ADAS controller to the ESC that has a deceleration input port and a moment input port. Since performance of a vehicle with a normal ESC can be improved significantly without remodeling, high-quality motion control can be implemented in a plurality of embodiments, and thus the technology and apparatus can be provided to a greater number of drivers (FIG. 39).

In the foregoing, the yaw moment control (ESC) based on lateral slip information, the acceleration/deceleration control (G-Vectoring) based on a lateral jerk and the control (Hybrid control) of the combination of them have been mentioned, and it has been indicated that, from constrains of the hardware, "transit control" from a transient state to a limit region is required. Further, basic ideas such as a technological background and an implementing method regarding the yaw moment control (moment plus: M+) based on a lateral jerk have been presented, and the effectiveness of the vehicle motion control (Hybrid+) having the three modes of ESC, GVC and M+ has been presented.

Further, the effectiveness of the present invention has been described using the two working examples and actual vehicle test results. In the actual vehicle test results, it has been indicated that a sufficient effect can also be achieved with a system configuration which uses a vehicle CAN of a relatively low communication speed. It has been demonstrated that, with a system configuration where a plurality of controllers are connected by a CAN signal as well, vehicle motion control having high-quality drivability and stability according to the present invention can be implemented.

The present invention makes it possible to achieve the Hybrid+ control by virtue of: adding, to motion control of a vehicle (Hybrid control of G-Vectoring and ESC [DYC]), the moment control (M+) for transit between the two types of control which had to be incorporated into ESC, the vehicle improving its drivability, stability, and driving comfort; mounting the G-Vectoring and the M+ at least on a controller connected by communication; and sending an instruction to the ESC via communication. This indicates that the present technology and apparatus can be provided to a greater number of drivers in a plurality of embodiments of hardware.

DESCRIPTION OF REFERENCE NUMERALS

0: vehicle
1: left rear wheel motor
2: right rear wheel motor
7: power steering
10: accelerator pedal
11: brake pedal
16: steering
21: lateral acceleration sensor
22: longitudinal acceleration sensor
23, 24, 25: differentiating circuit
31: accelerator position sensor
32: brake pedal position sensor
33: driver steering angle sensor
38: yaw rate sensor
40: central controller
44: steering controller
46: power train controller
48: pedal controller
51: accelerator reaction force motor
52: brake pedal reactive force motor
53: steering reactive force motor
61: left front wheel
62: right front wheel
63: left rear wheel
64: right rear wheel
70: millimeter wave ground vehicle speed sensor

The invention claimed is:

1. A motion controlling apparatus for a vehicle, comprising:
    a control unit for controlling independently driving forces or a driving torques and/or braking forces or braking torques of wheels of a vehicle;
    a vehicle acceleration/deceleration instruction calculator for calculating a vehicle acceleration/deceleration instruction value on the basis of a lateral jerk of the vehicle;
    a first vehicle yaw moment instruction calculator for calculating a first vehicle yaw moment instruction value on the basis of the lateral jerk of the vehicle; and
    a second vehicle yaw moment instruction calculator for calculating a second vehicle yaw moment instruction value on the basis of lateral slip information of the vehicle,
    wherein the motion controlling apparatus further includes:
    a first mode under which acceleration/deceleration of the vehicle is controlled on the basis of the vehicle acceleration/deceleration instruction value that generates driving forces or driving torques and/or braking forces or braking torques of four wheels of the vehicle, the driving forces or driving torques for left wheels and that for right wheels being substantially equal to each other;
    a second mode under which yaw moment of the vehicle is controlled on the basis of the first vehicle yaw moment instruction value that generates driving forces or driving torques and/or braking forces or braking torques of four wheels of the vehicle, the driving forces or driving torques for left wheels and that for right wheels being different from each other; and
    a third mode under which yaw moment of the vehicle is controlled on the basis of the second vehicle yaw moment instruction value that generates driving forces or driving torques and/or braking forces or braking torques of four wheels of the vehicle, the driving forces or driving torques for left wheels and that for right wheels being different from each other.

2. The motion controlling apparatus for a vehicle according to claim 1, wherein the first mode includes one or both of:
    a 1.1th mode, applied when a product of the vehicle lateral acceleration and the vehicle lateral jerk is positive, under which deceleration of the vehicle is controlled on the basis of the vehicle acceleration/deceleration instruction value calculated by the vehicle acceleration/deceleration instruction calculator using the lateral jerk of the vehicle; and
    a 1.2th mode, applied when the product of the vehicle lateral acceleration and the vehicle lateral jerk is negative, under which acceleration of the vehicle is controlled on the basis of the vehicle acceleration/deceleration instruction value calculated by the vehicle acceleration/deceleration instruction calculator using the lateral jerk of the vehicle.

3. The motion controlling apparatus for a vehicle according to claim 1, wherein the second mode includes one or both of:
    a 2.1th mode, applied when the product of the vehicle lateral acceleration and the vehicle lateral jerk is positive, under which a yaw moment on the turning promotion side of the vehicle is controlled on the basis of a yaw moment instruction value at a vehicle turning promotion side serving as the first vehicle yaw moment instruction value, the first vehicle yaw moment instruction value being calculated by the first vehicle yaw moment instruction calculator using the lateral jerk of the vehicle; and a 2.2th mode, applied when the product of the vehicle lateral acceleration and the vehicle lateral jerk is negative, under which a yaw moment instruction value on the vehicle stabilization side of the vehicle is controlled on the basis of a yaw moment instruction value on the vehicle stabilization side which is the first vehicle yaw moment instruction value, the first vehicle yaw moment instruction value being calculated by the first vehicle yaw moment instruction calculator using the lateral jerk of the vehicle.

4. The motion controlling apparatus for a vehicle according to claim 1, wherein the third mode includes both of:

a 3.1th mode under which the yaw moment on the stabilization side of the vehicle is controlled on the basis of the yaw moment instruction value on the vehicle stabilization side serving as the second vehicle yaw moment instruction value; and a 3.2th mode under which the yaw moment on the turning promotion side of the vehicle is controlled on the basis of the yaw moment instruction value on the vehicle turning promotion side serving as the second vehicle yaw moment instruction value.

5. The motion controlling apparatus for a vehicle according to claim 1, further comprising:

an arbitrator for arbitrating the first vehicle yaw moment instruction value and the second vehicle yaw moment instruction value, wherein the arbitrator adopts and outputs one that has the higher absolute value of the first vehicle yaw moment instruction value and the second vehicle yaw moment instruction value.

6. The motion controlling apparatus for a vehicle according to claim 1, wherein:

the vehicle acceleration/deceleration instruction calculator and the first vehicle yaw moment instruction calculator are provided in the same controller; and the vehicle acceleration/deceleration instruction value calculated by the vehicle acceleration/deceleration instruction calculator and the first vehicle yaw moment instruction value calculated by the first vehicle yaw moment instruction calculator are transmitted from the controller to the control unit by communication.

7. The motion controlling apparatus for a vehicle according to claim 1, further comprising a motor for generating a braking force or a braking torque, wherein the control unit includes a regenerator for regenerating electric power generated when the braking force or the braking torque is generated by the motor.

8. The motion controlling apparatus for a vehicle according to claim 1, wherein the vehicle acceleration/deceleration instruction value is generated such that the vehicle is decelerated when the lateral acceleration of the vehicle increases but is accelerated when the lateral acceleration of the vehicle decreases.

9. The motion controlling apparatus for a vehicle according to claim 1, wherein the vehicle acceleration/deceleration instruction value is generated such that the vehicle is decelerated when a steering angle of the vehicle increases but is accelerated when the steering angle of the vehicle decreases.

10. The motion controlling apparatus for a vehicle according to claim 1, wherein the vehicle acceleration/deceleration instruction value is generated on the basis of the lateral acceleration and the lateral jerk of the vehicle and a gain which is determined in advance, the lateral acceleration and the lateral jerk being generated from the steering angle and velocity of the vehicle.

11. The motion controlling apparatus for a vehicle according to claim 1, wherein, where the lateral acceleration of the vehicle is represented by $G_y$, the lateral jerk of the vehicle by $G_{y\_dot}$, a predetermined lateral jerk gain by $C_{xy}$, a predetermined primary delay time constant by T, a predetermined Laplace operator by s, and a predetermined offset by $G_{x\_DC}$, the vehicle acceleration/deceleration instruction value $G_{xc}$ is calculated in accordance with the following formula:

$$G_{xc} = -\text{sgn}(G_y \cdot \dot{G}_y)\frac{C_{xy}}{1+Ts}|\dot{G}_y| + G_{x\_nc}.$$

12. The motion controlling apparatus for a vehicle according to claim 1, wherein the first vehicle yaw moment instruction value is generated such that turning of the vehicle is promoted when the lateral acceleration of the vehicle increases but restores when the lateral acceleration of the vehicle decreases.

13. The motion controlling apparatus for a vehicle according to claim 1, wherein the first vehicle yaw moment instruction value is generated such that the turning of the vehicle is promoted when the steering angle of the vehicle increases but restores when the steering angle of the vehicle decreases.

14. The motion controlling apparatus for a vehicle according to claim 1, wherein the first vehicle yaw moment instruction value is generated on the basis of the lateral acceleration and the lateral jerk of the vehicle and a predetermined gain, the lateral acceleration and the lateral jerk being generated from the steering angle and velocity of the vehicle.

15. The motion controlling apparatus for a vehicle according to claim 1, wherein, where the vehicle lateral acceleration is represented by $G_y$, the vehicle lateral jerk by $G_{y\_dot}$, a predetermined lateral acceleration gain by $C_{mnl}$, a predetermined primary delay time constant by $T_{mn}$ and a predetermined Laplace operator by s, the first vehicle yaw moment instruction $M_{z+}$ is calculated in accordance with the following formula:

$$M_{z+} = \text{sgn}(G_y \cdot \dot{G}_y)\frac{C_{mnl}}{1+T_{mn}s}|\dot{G}_y|.$$

16. The motion controlling apparatus for a vehicle according to claim 10 wherein the lateral jerk is calculated by a time differentiating process for a lateral acceleration which has been estimated from the steering angle and the vehicle velocity, estimated from a yaw rate detected with a yaw rate sensor and the vehicle velocity, or measured with a lateral acceleration sensor.

17. The motion controlling apparatus for a vehicle according to claim 1, wherein:

the vehicle acceleration/deceleration instruction value includes an acceleration instruction value and a deceleration instruction value; and the acceleration instruction value becomes zero when a brake operation instruction from a driver is inputted and the deceleration instruction value becomes zero when an acceleration operation instruction from the driver is inputted.

18. The motion controlling apparatus for a vehicle according to claim 1, wherein the vehicle acceleration/deceleration instruction value becomes zero on the basis of external information detected by an external information detector, the external information including at least one of obstacle information, preceding vehicle information, and succeeding vehicle information.

19. The motion controlling apparatus for a vehicle according to claim 11, wherein the vehicle acceleration/deceleration instruction calculator changes the lateral jerk gain $C_{xy}$ on the basis of external information detected by an external information detector, the external information including at least one of obstacle information, preceding vehicle information, and succeeding vehicle information.

20. The motion controlling apparatus for a vehicle according to claim 15, wherein the first vehicle yaw moment instruction calculator changes the lateral jerk gain $C_{mnl}$ on the basis of external information detected by an external information detector, the external information including at least one of obstacle information, preceding vehicle information, and succeeding vehicle information.

\* \* \* \* \*